(12) United States Patent
Dewert et al.

(10) Patent No.: US 9,980,575 B2
(45) Date of Patent: May 29, 2018

(54) UNIVERSAL ADJUSTMENT DRIVE WITH BOWDEN CABLE

(71) Applicant: Deon Group AG, Zurich (CH)

(72) Inventors: Eckhart Dewert, Goldingen (CH); Jörg Henle, Weikersheim (DE)

(73) Assignee: Deon Group AG, Zürich (CH)

( * ) Notice: Subject to any disclaimer, the term of this patent is extended or adjusted under 35 U.S.C. 154(b) by 624 days.

(21) Appl. No.: 14/255,721

(22) Filed: Apr. 17, 2014

(65) Prior Publication Data

US 2015/0074908 A1    Mar. 19, 2015

(30) Foreign Application Priority Data

Apr. 18, 2013  (DE) .................. 10 2013 006 640
Aug. 9, 2013   (DE) .................. 20 2013 007 106 U

(51) Int. Cl.
*A47C 20/08*   (2006.01)
*A47C 20/04*   (2006.01)
*F16C 1/10*    (2006.01)

(52) U.S. Cl.
CPC ............ *A47C 20/08* (2013.01); *A47C 20/041* (2013.01); *A47C 20/042* (2013.01); *F16C 1/106* (2013.01); *Y10T 74/20341* (2015.01)

(58) Field of Classification Search
CPC ..... A47C 20/08; A47C 20/041; A47C 20/042; F16C 1/106; Y10T 74/20341
See application file for complete search history.

(56) References Cited

U.S. PATENT DOCUMENTS

| 3,028,199 | A | * | 4/1962 | Beierbach ................ B60N 2/22 297/378.12 |
| 5,449,219 | A | * | 9/1995 | Hay ...................... B60N 2/666 297/284.4 |
| 5,528,948 | A |   | 6/1996 | DeGelis |
| 5,544,375 | A | * | 8/1996 | Urness ................ A47C 20/041 5/611 |
| 6,754,922 | B2|   | 6/2004 | Dewert |
| 6,961,971 | B2|   | 11/2005| Schneider et al. |
| 7,770,972 | B2| * | 8/2010 | Popa .................... B60N 2/0296 297/284.4 |

(Continued)

FOREIGN PATENT DOCUMENTS

| DE | 3103922 A1 | 12/1982 |
| DE | 3409223 C2 | 7/1987 |

(Continued)

*Primary Examiner* — David E Sosnowski
*Assistant Examiner* — Amanda L Bailey
(74) *Attorney, Agent, or Firm* — Shlesinger, Arkwright & Garvey LLP

(57) ABSTRACT

Electric motor furniture drive for adjusting parts of a piece of furniture relative to one another has a drive unit which has at least one electric motor and is in drive connection with at least one tensioning unit. Furniture drive has a base body which is preferably configured as a housing and is accommodated in or on the tensioning unit. At least two Bowden cables are operatively associated with each tensioning unit, traction cables of Bowden cables being in operative connection with associated tensioning unit. Traction cables are guided or guidable to tensioning unit(s) through at least one recess in the housing. The sheathings of the Bowden cables are fixed or fixable to the base body.

10 Claims, 21 Drawing Sheets

(56) References Cited

U.S. PATENT DOCUMENTS

| | | | | |
|---|---|---|---|---|
| 8,875,592 | B2* | 11/2014 | Bastholm | A47C 20/041 74/89.38 |
| 9,004,594 | B2* | 4/2015 | Hong | B60N 2/66 297/284.4 |
| 2002/0113472 | A1* | 8/2002 | Blendea | B60N 2/0232 297/284.4 |
| 2002/0144350 | A1* | 10/2002 | Shih | A47C 20/041 5/620 |
| 2007/0028381 | A1* | 2/2007 | Palay | A61G 7/053 5/81.1 R |
| 2009/0007707 | A1* | 1/2009 | Schumacher | B60J 7/1851 74/30 |
| 2009/0151490 | A1* | 6/2009 | Kristensen | F16H 25/2015 74/89.37 |
| 2014/0191553 | A1* | 7/2014 | Blendea | B60N 2/20 297/354.1 |

FOREIGN PATENT DOCUMENTS

| | | |
|---|---|---|
| DE | 3842078 A1 | 7/1989 |
| DE | 29602947 U1 | 7/1996 |
| DE | 29714746 U1 | 9/1997 |
| DE | 19729282 A1 | 1/1998 |
| DE | 29811566 U1 | 8/1998 |
| DE | 19843259 C1 | 12/1999 |
| DE | 10017989 C2 | 10/2001 |
| DE | 10017979 C2 | 4/2002 |
| DE | 10 2008 028586 A1 | 12/2009 |
| EP | 0372032 A1 | 6/1990 |
| EP | 0788325 | 8/1997 |
| EP | 1020171 A1 | 7/2000 |
| EP | 1294255 B1 | 6/2006 |
| FR | 2727296 | 5/1996 |
| GB | 2334435 | 8/1999 |
| WO | WO 96/29970 | 10/1996 |
| WO | WO 2008/113401 | 9/2008 |

* cited by examiner

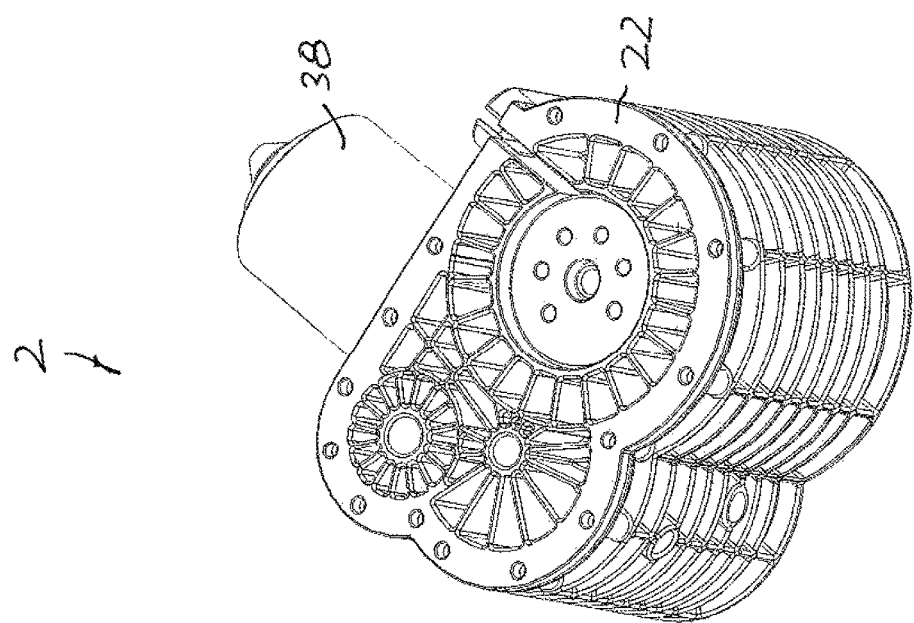

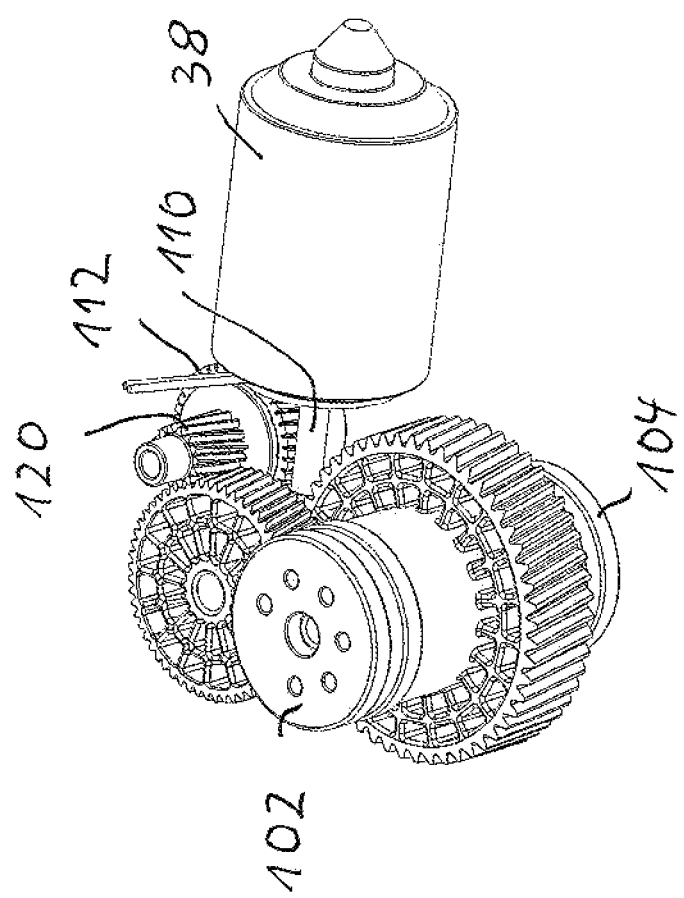

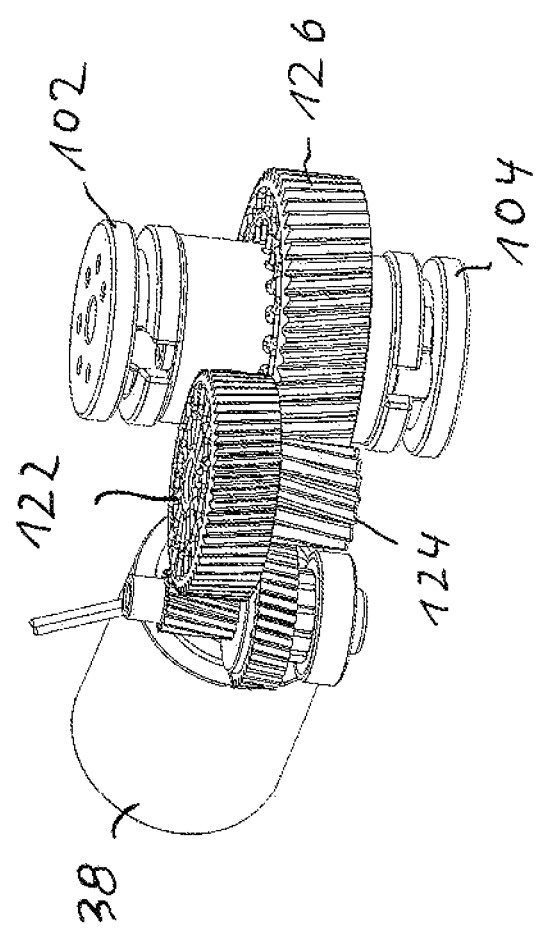

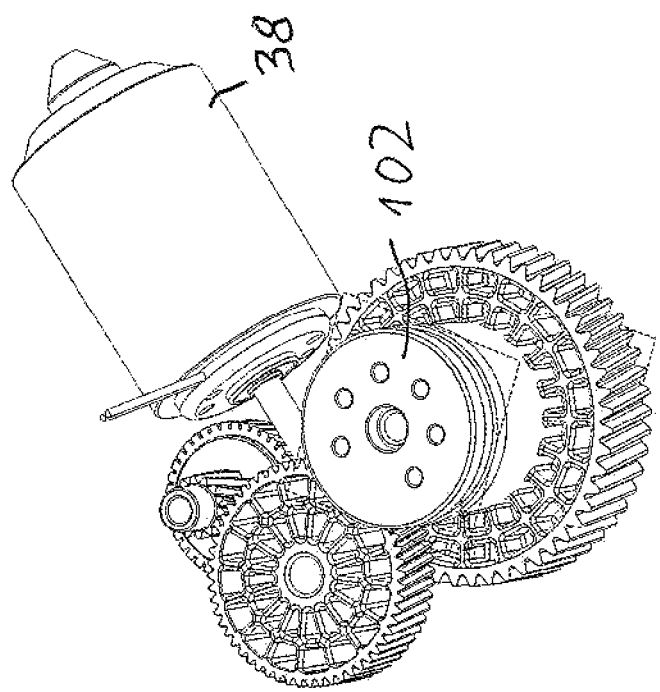

UNIVERSAL ADJUSTMENT DRIVE WITH BOWDEN CABLE

CROSS-REFERENCE TO RELATED APPLICATIONS

This application claims the priority of German patent application no. 10 2013 006 640.9, filed Apr. 18, 2013, and this application claims the priority of German patent application no. 20 2013 007 106.0, filed Aug. 9, 2013, and each of which is incorporated herein by reference.

FIELD OF THE INVENTION

The invention relates to a universal adjustment drive with a Bowden cable. More particularly, the invention relates to an electric motor furniture drive for adjusting parts of a piece of furniture relative to one another. Even more particularly, the invention relates to a universal adjustment drive with Bowden cable, particularly suited for an electric motor furniture drive.

BACKGROUND OF THE INVENTION

For adjustment of slatted frames, for example, so-called dual drives are known which have a housing, designed as a separate component which is connectable to the slatted frame, in which two adjustment units are accommodated, one of which is used, for example, for adjusting a back support part, and the other of which is used for adjusting a leg support part, of the slatted frame. In the known dual drives the adjustment units are designed as a spindle drive, the drive coupling to a support part to be adjusted being established via a coupling lever which is connected in a rotationally fixed manner to a swivel shaft with which the support part to be adjusted is associated. For adjusting the support part, the spindle nut of the spindle drive presses against the coupling lever, so that the swivel shaft and thus the support part swivels. Dual drives of this type are known from EP 0372032 A1 and DE 3842078 A1, for example.

A furniture drive designed as a dual drive is known from DE 10017989 C2 and DE 10017979 C2, in which each adjustment unit has an electric motor-driven wind-up device for a cable-, band-, or chain-shaped tensioning means which is connected in the manner of a pulley block to a swivel lever which is connected to a swivel shaft in a rotationally fixed manner, the swivel shaft in turn being in operative connection with a support part to be adjusted.

Furniture drives which operate according to a similar operating principle are also known from DE 3409223 C2, DE 19843259 C1, and EP 1020171 A1.

Dual drives which operate according to various operating principles are also known from DE 19729282 A1, DE 29811566 U1, and DE 29714746 U1.

An adjustable slatted frame is known from DE 3900384, in which the adjustment of a head or leg support part of the slatted frame takes place by means of a pneumatic cylinder.

A gas spring adjustment fitting for slatted frames is known from DE 29602947 U1, in which a cable pull is provided for activating the gas spring.

A slatted frame is known from DE 3103922 A1, in which the adjustment of an upper body support part, for example, takes place via a windshield wiper motor and a scissor lift.

A dual drive is known from EP 1294255 B1, in which the transmission of force from a linearly movable drive element to a swivel lever, which is in operative connection with a swivel shaft which is in operative connection with a support part to be adjusted, takes place via a pulley block. Similar furniture drives are also known from FR 2727296, DE 3409223 C2, DE 19843259 C1, GB 2334435, and U.S. Pat. No. 5,528,948.

Furthermore, slatted frames are known in which the adjustment apparatus for adjusting a support part is partially or completely integrated into a base body of the slatted frame. In this sense, DE 19962541 C2 (corresponding to EP 1239755 B1, JP 2001-546280, and U.S. Pat. No. 6,754,922) discloses and describes a motor-adjustable support apparatus having a first support part which has mutually parallel longitudinal beams, and which in the support apparatus known from the cited publication is formed by a stationary center support part. The known support apparatus also has additional support parts which are adjustable relative to the first support part via drive means. In the support apparatus known from the cited publication, a first longitudinal beam of the first support part is designed for accommodating the drive means as a hollow profile, whereby the entire drive, including a drive motor, is accommodated in the hollow longitudinal beam. For this reason, the drive motor does not protrude beyond the first longitudinal beam in the vertical direction thereof, so that the support apparatus known from the cited publication has an extremely small overall height. A similar support apparatus is also known from DE 10046751 (corresponding to EP 1239754 B1, JP 2001-547994, and U.S. Pat. No. 6,961,971).

A motor-adjustable support apparatus for a mattress of a bed is known from WO 96/29970, having multiple support parts which are arranged in succession in the longitudinal direction of the support apparatus, and which are pivotable relative to a first support part via drive means. The support parts are supported on an outer frame whose profile height is significantly greater than the profile height of the support parts. In the support apparatus known from the cited publication, parts of the outer frame are designed as a hollow profile, and parts of the drive means for adjusting the support parts relative to one another are accommodated in the hollow profile. The drive motor is situated at an inner side of a part of the outer frame.

A motor-adjustable support apparatus for a mattress of a bed is known from DE 69507158 T2 (corresponding to EP 0788325 B1), having a first support part which has a longitudinal beam, and having at least one second support part which is pivotable relative to the first support part via drive means. In the known support apparatus, the drive motor is situated outside the base area of the support apparatus and is affixed to a frame-like extension of the first support part.

A slatted frame is known from EP 1633219 B1, in which parts of the adjustment apparatus are accommodated in a hollow longitudinal beam, while the drive motor is situated outside the longitudinal beam, and through a recess is in drive connection with the parts of the adjustment apparatus which are accommodated in the longitudinal beam.

A furniture drive which is provided for adjusting a drawer relative to a body of a cabinet is known from WO 2008/113401, in which the adjustment of the drawer takes place via a flexible toothed rack which is engaged with a gearwheel.

A slatted frame having an integrated adjustment apparatus is known from DE 10 2008 028586 A1, in which the transmission of force from drive motors of the adjustment apparatus to the support parts to be adjusted takes place via traction cables that are guided over deflections.

OBJECTS AND SUMMARY OF THE INVENTION

An object of the invention is to provide an electric motor furniture drive for adjusting parts of a piece of furniture relative to one another, having a simple and compact design.

Another object of the invention is to provide electric motor furniture drive for adjusting parts of a piece of furniture relative to one another. An object of the invention is to provide a universal adjustment drive with Bowden cable, particularly suited for an electric motor furniture drive.

These objects are achieved by the invention set forth herein.

The basic concept of the invention lies in the transmission of force from an electric motor drive unit which is used, for example, for adjusting support parts of a slatted frame relative to one another, to the support part to be adjusted via a Bowden cable having a traction cable and sheathing. The invention thus departs from the previous concepts of the transmission of force known for slatted frames, for example, and for furniture drives provides the principle of a Bowden cable, which is known from technical areas such as braking and gear shifting of bicycles, accelerator cables and clutch cables in motorcycles, and in automotive engineering.

This results in significant technical advantages.

One particular advantage of the invention is that considerable freedom with regard to the arrangement of a drive motor relative to a support part to be adjusted or some other component results due to the fact that the drive motor may be situated at practically any desired location on the piece of furniture when a Bowden cable of appropriate length is used.

Another advantage of the invention is that, due to the considerable freedom with regard to the positioning of the drive motor or the drive motors, adjustment apparatuses having a particularly flat design may be implemented.

For example and in particular, all drive motors that are necessary for adjusting a slatted frame are accommodated in a flat housing which may be affixed at any suitable location on a slatted frame, for example, or simply placed on the base beneath the slatted frame.

The freedom with regard to the arrangement of drive motors is further increased due to the fact that to a significant degree Bowden cables may also be laid in a curved manner without impairing their function of transmitting force.

Another advantage of the invention is that Bowden cables are available as relatively simple, inexpensive, and robust standard components.

It has surprisingly been shown that Bowden cables, for example in combination with wind-up devices or spindle drives, are very well suited for applying the forces that are necessary, for example, for adjusting support parts of a slatted frame under the load of a person resting on the slatted frame.

The use of a Bowden cable in a furniture drive is already known from DE 29811566 U1, but only in conjunction with disengagement of the furniture drive, and thus in conjunction with use in which much smaller forces occur than with the adjustment of support parts of a slatted frame.

Another advantage of the invention is that slatted frames of different widths may be implemented while using the same Bowden cables. Whereas for a wider slatted frame the Bowden cable may be guided more directly from the associated tensioning element to the support part to be adjusted, for a narrower slatted frame it may be guided in a curve to the support part to be adjusted. In both cases, however, the same Bowden cable may be used. The manufacture of slatted frames having different widths is thus particularly simple and cost-effective due to the use of identical parts.

The number of electric motors, tensioning units, tensioning elements, and Bowden cables is selectable within a wide range, depending on the particular requirements.

According to the invention, a drive unit is provided which has at least one electric motor and which is in drive connection with at least one tensioning unit. At least two Bowden cables are associated with the, or each, tensioning unit, the traction cables of the Bowden cables each being in operative connection (tensile connection) with the associated tensioning unit. Thus, due to the association with the same tensioning unit, the Bowden cables associated with the tensioning unit are actuated at the same time. For the adjustment of slatted frames, in order to avoid twisting of a support part it may be necessary to simultaneously introduce an adjustment force into the two longitudinal beams of the support part situated at a lateral distance from one another. For this purpose, according to the invention the Bowden cables which are associated with a tensioning unit may be used, one of the Bowden cables being associated with one longitudinal beam, and the other Bowden cable being associated with the other longitudinal beam. Since the Bowden cables are actuated at the same time, the adjustment force is synchronously introduced into both longitudinal beams, thus achieving synchronization and therefore reliably avoiding twisting of the support part. Other synchronization measures, whether via electrical means or by using torsion shafts, are therefore no longer necessary.

According to the invention, the tensioning unit or the tensioning units is/are preferably accommodated in a housing which may be designed as a flat, compact assembly. The housing preferably has at least one recess through which the traction cables of the Bowden cables are guided or guidable to the tensioning unit or the tensioning units. The sheathings of the Bowden cables are fixed or fixable to the housing.

For example, the electric motor furniture drive according to the invention may have an electric motor which is in drive connection with two tensioning units. A dual drive is thus achieved, whereby one tensioning unit may, for example, be used for adjusting a leg support part, and the other tensioning unit may be used for adjusting an upper body support part, of a slatted frame. In the simplest case, both tensioning units are actuated by the electric motor at the same time, so that the back support part and the upper body support part of the slatted frame are accordingly adjusted simultaneously. According to the invention, in such a configuration it is also possible to provide a time delay with regard to the adjustment of the back support part and of the leg support part, for example in that one of the tensioning units has a certain "dead stroke" during which adjustment of the associated support part does not yet take place.

In order to adjust at least two support parts or other furniture components completely independently of one another, the drive unit may have at least two electric motors, one of which is associated with one tensioning unit, and the other of which is associated with another tensioning unit.

If particularly large adjustment forces are to be applied, according to the invention it is also possible to provide two or more electric motors which are associated with the same tensioning unit and which are in drive connection with same. The adjustment force which may be applied is thus increased compared to the use of a single electric motor that is associated with a tensioning unit.

If it is desirable or necessary according to the particular requirements, according to the invention a furniture drive may also have more than two electric motors, whereby one electric motor may be associated with each tensioning unit, or at least two electric motors may be associated with at least one tensioning unit, in the above-described manner In the simplest case, the furniture drive according to the invention has an electric motor which is in force-transmitting connection with a single tensioning unit. In this way a single drive is achieved, whose two Bowden cables which are associated with the tensioning unit may be used to introduce an adjustment force into the component to be adjusted at two different points of applied force, depending on the particular requirements.

The furniture drive according to the invention is suitable for adjusting any given furniture components in the furniture sector. For example, the furniture drive according to the invention is suitable for adjusting any given seating or lying furniture, for example slatted frames or armchairs. For example, the furniture drive according to the invention is also suitable for adjusting hospital beds or health care beds and tables. If, for example, the height of a table is to be adjusted via two simultaneously actuatable lifting columns, a furniture drive according to the invention may be used, whereby two tensioning elements of the furniture drive according to the invention are synchronously controlled by the same electric motor, and one tensioning element is associated with each lifting column of the table.

The invention thus provides for the first time a universal electric motor furniture drive which, with the same design, is suitable for adjusting a large variety of furniture or furniture components.

The tensioning unit or the tensioning units of the furniture drive according to the invention, also referred to below as the "drive" for short, may have any suitable design. Its function, namely, for pulling on a traction cable of the Bowden cable for adjusting a component, may be designed according to any given suitable kinematics. In this sense, according to the invention a tensioning unit is understood to mean an arrangement that is suitable for pulling on the traction cable of a Bowden cable. For example, the tensioning element may be designed as a wind-up device or the like.

One advantageous further embodiment of the invention provides that each tensioning unit has at least two tensioning elements, with each of which a traction cable of a Bowden cable is associated.

To design the tensioning element in a particularly simple manner, one advantageous further embodiment of the invention provides that at least one tensioning element is supported in or on the housing so as to be linearly movable.

A guide for a tensioning element may be designed as a separate component which is connectable to the housing of the drive. To further simplify the design of the drive according to the invention, one advantageous further embodiment of the invention provides that at least one guide for at least one tensioning element is integrated into the housing, in particular molded in one piece into the housing. In a particularly advantageous manner the housing may be formed, for example, as an injection-molded part into which the guide or guides is/are molded.

Accordingly, another advantageous further embodiment of the invention provides that the housing is at least partially made of plastic.

In the embodiment having the linearly movable tensioning element, the guide is advantageously a linear guide as provided in another further embodiment of the invention.

One advantageous further embodiment of the above-mentioned embodiment provides that the two linear guides associated with tensioning elements extend in parallel or approximately in parallel to one another.

To improve the stability of the housing in the area of the guide, i.e., in an area in which high reaction forces may occur during operation of the furniture drive, another advantageous further embodiment of the invention provides that the housing has a double-wall design, at least in sections, in the area of the guide.

Another advantageous further embodiment of the invention provides that the housing is composed at least of two half-shells. In this embodiment the housing has a particularly simple design. The furniture drive according to the invention may be installed, for example, in such a way that the integral parts of the furniture drive are inserted or placed in one half-shell, and may be accommodated and optionally fixed between the half-shells in a positive-fit manner by placing the other half-shell on top.

The sheathing of a Bowden cable may be fixed to the housing of the drive in any desired manner. In this regard, a positive-fit connection between the sheathing of the Bowden cable and the housing is advantageous, so that a nondisplaceable connection between the sheathing of the Bowden cable and the housing is ensured, even when large adjustment forces are applied. For this purpose, one advantageous further embodiment of the invention provides that at least one Bowden cable has a flange which is nondisplaceably connected to the sheathing of the Bowden cable. This flange may be fixed to the housing of the furniture drive in a positive-fit manner, so that a nondisplaceable connection between the sheathing of the Bowden cable and the housing is achieved in the desired manner.

In principle, according to the invention it is sufficient for the drive unit to have a single electric motor which controls each tensioning element or acts on same with an adjustment force in the above-described manner. To obtain greater flexibility with regard to the adjustment function to be achieved, one advantageous further embodiment of the invention provides that the drive unit has at least two electric motors.

In this regard, another advantageous further embodiment of the invention provides that at least two electric motors are controllable independently of one another. Due to the independently controllable electric motors, according to the invention it is possible, for example, to adjust two tensioning elements, and thus two furniture components, independently of one another.

Another advantageous further embodiment of the invention provides that at least one electric motor is associated with each tensioning element and is in drive connection with same.

With regard to the spatial arrangement of more than two electric motors in the housing, one extremely advantageous further embodiment provides that the electric motors are situated with respect to one another in such a way that their drive shafts face one another. This results in a particularly compact and space-saving design.

The electric motor or the electric motors may be or become connected to the housing in any suitable manner. In this regard, one advantageous further embodiment of the invention provides that the housing is shaped in such a way that at least one electric motor is insertable into the housing, and in the inserted position is held by the housing in a positive-fit manner. Thus, additional securing of the electric motor to the housing is not necessary, which saves on time and therefore installation costs. For example and in particular, half-shells of the housing may be shaped in such a way that in the installed state they hold the electric motor between them in a positive-fit manner. In other words, in this embodiment the electric motor may be installed by inserting it into one half-shell and subsequently fixing a housing in a positive-fit manner by placing the other half-shell on top.

Another advantageous further embodiment of the invention provides that the drive unit has at least one gear whose integral parts are situated on a gear holding part, in particular mounted on same. The gear holding part may be angled, for example, i.e., designed as a so-called gear angle, and may hold the integral parts of the gear. If, for example, the drive unit has two electric motors, the gear holding part may be designed in such a way that it holds the two gears, each of which is associated with an electric motor.

To further simplify the installation of the drive according to the invention, one advantageous further embodiment of this embodiment provides that at least one electric motor is secured to the gear holding part, and together with the gear holding part forms a motor/gear assembly. In particular, the housing of the electric motor may be screwed to the gear holding part.

A particularly advantageous further embodiment of the above-mentioned embodiment provides that the housing is shaped in such a way that the motor/gear assembly is insertable into the housing, and in the inserted position is held by the housing in a positive-fit manner. The installation of the drive according to the invention is further simplified in this way. For example, the motor/gear assembly may be inserted into one half-shell of the housing and fixed by means of the other half-shell. The half-shells may then be joined together, for example by screwing. This results in particularly simple installation.

Limit switching in end positions of a tensioning element, and thus in end positions of an adjustment movement brought about by this tensioning element, may take place in any suitable manner, for example by detecting the motor current, which sharply increases when an end position is reached. In this regard, one advantageous further embodiment of the invention provides that at least one end position switch is associated with a tensioning element. Appropriate end position switches, also referred to as limit switches, are available as robust and inexpensive standard components.

Each end position switch may be connected to the housing in any suitable manner, for example by gluing it into the housing. In this regard, one advantageous further embodiment of the invention provides that the housing has at least one holding apparatus for holding the end position switch. For example, the holding apparatus may have pins which are molded into the housing, on which the position switch having recesses, which are formed in its housing, is placed.

To change the end position and to be able to select it according to the particular requirements, one advantageous further embodiment of the above-mentioned embodiment provides that the housing has a plurality of holding apparatuses which correspond to various switching positions of the end position switch.

The, or each, tensioning element of the drive according to the invention may have any suitable design. In this regard, one advantageous further embodiment of the invention provides that the, or each, tensioning element is a spindle nut of a spindle drive, the spindle nut being situated on a threaded spindle, which is in rotary drive connection with the drive unit, so as to be rotationally fixed and movable in the axial direction. Appropriate spindle drives are available as simple, inexpensive standard components, and are robust and suitable for applying large adjustment forces.

In a kinematic reversal of the above-mentioned embodiment, at least one tensioning element may also have a threaded spindle which is guided in a rotationally fixed manner and situated on the one stationary spindle nut, which is in rotary drive connection with an electric motor.

One extremely advantageous further embodiment of the invention provides that at least one tensioning element is designed as a wind-up device for winding the traction cable of a Bowden cable. In this embodiment, a tensile force is exerted on the traction cable of the Bowden cable, thus winding the traction cable. This results in a more compact and space-saving design. Another advantage of this embodiment is that appropriate wind-up devices are available as simple, inexpensive, and robust components and are suitable for applying large forces.

One advantageous further embodiment of the above-mentioned embodiment provides that at least one tensioning unit has two wind-up devices, one of which is associated with one of the Bowden cables that is associated with the tensioning unit, and the other of which is associated with the other of the Bowden cables that is associated with the tensioning unit. In this embodiment, the two (or at least two) traction cables associated with a tensioning unit are wound up via the wind-up devices in order to apply an adjustment force.

Depending on the particular requirements, a tensioning unit may also have more than two wind-up devices, so that more than two traction cables of Bowden cables may also be wound up, corresponding to the number of wind-up devices being provided.

One advantageous further embodiment of the embodiment having at least two wind-up devices provides that the wind-up devices which are associated with a tensioning unit are rotationally synchronized. This ensures that Bowden cables associated with the one tensioning unit are pulled by the two traction cables. If necessary according to the particular requirements, according to the invention it is also possible to associate only one Bowden cable with a tensioning unit.

An electric motor-adjustable support apparatus according to the invention for supporting padding of seating or lying furniture, in particular a mattress of a bed, is set forth herein. The support apparatus has at least two support parts which are adjustable relative to one another, at least one support part to be adjusted having a first longitudinal beam and a second longitudinal beam, the first and the second longitudinal beams being situated at a distance from one another transversely with respect to the longitudinal direction of the support apparatus. According to the invention, the support apparatus has at least one furniture drive according to the invention, a first of the Bowden cables associated with a tensioning unit being in force-transmitting connection with the first longitudinal beam, and the second of the Bowden cables associated with a tensioning unit being in force-transmitting connection with the second longitudinal beam. This ensures that a uniform adjustment force is introduced into both longitudinal beams of the support part during the adjustment of the support part, thus reliably avoiding twisting of the support part during its adjustment.

Use of a furniture drive according to the invention for adjusting a first component, in particular a furniture component, relative to a second component, in particular a furniture component, is provided as set forth herein, in which the traction cables of the Bowden cables associated with a tensioning unit being fixed to the locations on the first component which are spatially situated at a distance from one another in order to adjust the first component. The first component, such as a furniture component, a padding P, for example, as shown in FIG. 1, will be readily understood. A second component has been omitted for clarity and as it likewise not essential for a proper understanding of the invention.

The invention is explained in greater detail below with reference to the appended schematic drawings. All features described, illustrated in the drawings, and claimed in the patent claims, alone or in any given suitable combination, constitute the subject matter of the present invention, regardless of their recapitulation in the patent claims or their back-reference, and regardless of their description or illustration in the drawings.

Relative terms such as up, down, left and right are for convenience only and are not intended to be limiting.

BRIEF DESCRIPTION OF THE DRAWINGS

The drawings show the following:

FIG. 18 shows a fifth embodiment of a furniture drive according to the invention in the same illustration as FIG. 15, with the housing closed;

FIG. 19A shows in a perspective view integral parts of the drive unit and the tensioning unit of the embodiment according to FIG. 18, with the housing omitted purposes of illustration;

FIG. 19B shows in a perspective view integral parts of the drive unit and the tensioning unit of the embodiment according to FIG. 18, with the housing omitted purposes of illustration; and FIG. 19C shows in a perspective view integral parts of the drive unit and the tensioning unit of the embodiment according to FIG. 18, with the housing omitted purposes of illustration.

DETAILED DESCRIPTION OF THE INVENTION

Figure 1:
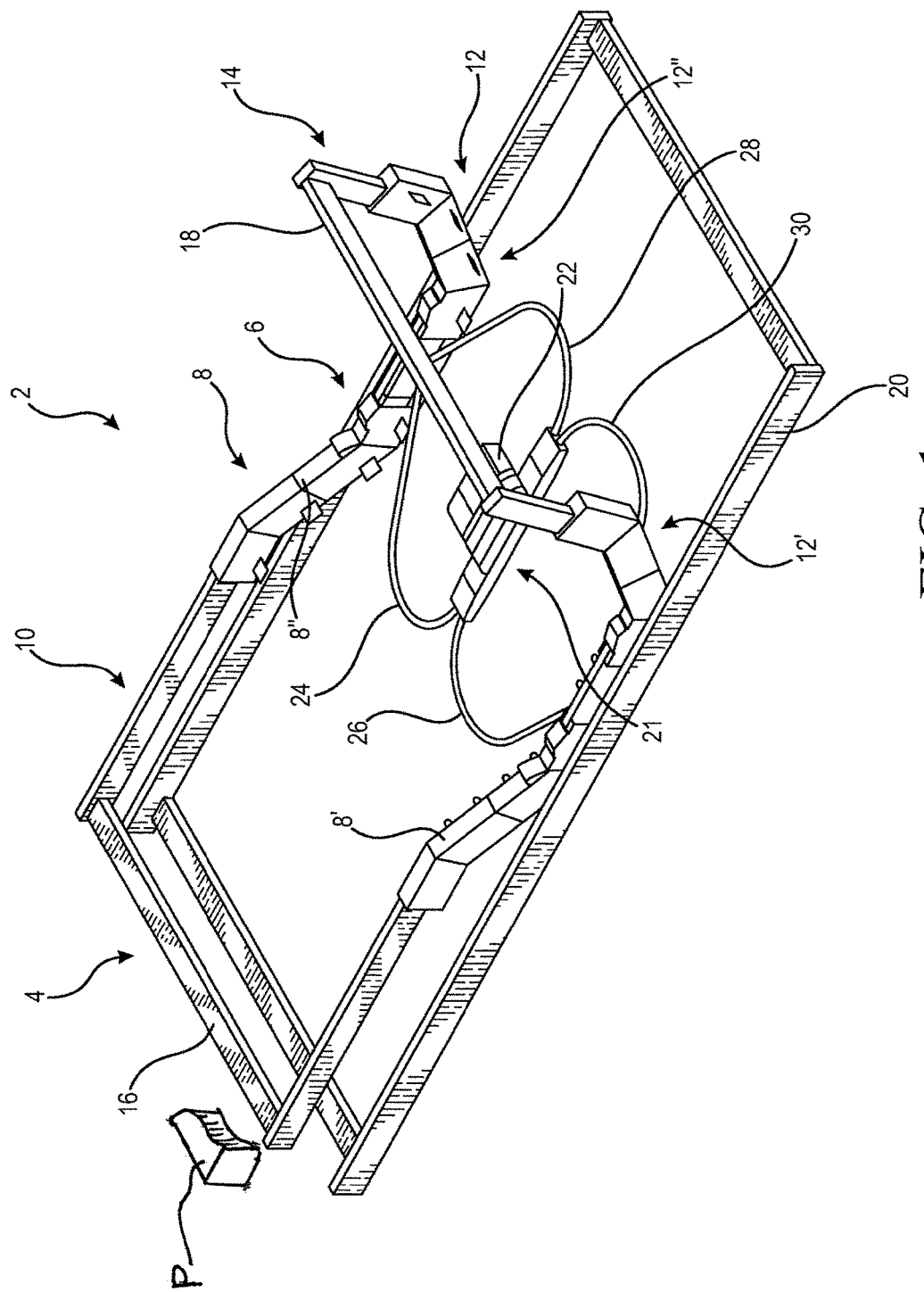
FIG. 1 shows a schematic perspective view of a slatted frame, provided with a first embodiment of a furniture drive according to the invention, in a maximum adjusted position.

Identical or corresponding components are provided with the same reference numerals in the figures of the drawing.

FIG. 1 schematically illustrates a slatted frame 2 in a perspective view, wherein the battens of the slatted frame, i.e., resilient slats such as sprung wooden slats, and associated mounting parts have been omitted in order to simplify the illustration.

The slatted frame 2 is adjustable by an electric motor, and during operation is used to support a mattress, not illustrated in the drawing. The slatted frame 2 has a base body 4 having support parts which are arranged in succession in the longitudinal direction of the slatted frame 2 and connected to one another so as to be pivotable about a horizontal pivot axis. In particular, in the illustrated embodiment the base body 4 has a stationary center support part 6, to which a leg support part 8 is connected in an articulated manner so as to be pivotable about a horizontal pivot axis, and the end of the leg support part facing away from the center support part 6 is connected to a calf support part 10 in an articulated manner so as to be pivotable about a horizontal pivot axis. The end of the center support part 6 facing away from the leg support part 8 is connected to an upper body support part 12 in an articulated manner so as to be pivotable about a horizontal pivot axis, and the end of the upper body support part facing away from the center support part 6 is connected to a head support part 14 in an articulated manner so as to be pivotable about a horizontal pivot axis.

Each of the support parts 6 through 14 of the slatted frame 2 has two longitudinal beams situated at a lateral distance from one another, i.e., transversely with respect to the longitudinal direction of the slatted frame 2, as denoted by way of example by reference numerals 8' and 8" for the leg support part 8, and by reference numerals 12', 12" for the upper body support part 12. The longitudinal beams of the slatted frame 2 formed by the longitudinal beams of the individual support parts 6 through 14 are connected to one another at their ends by crossbeams 16, 18, the first and second crossbeams 16,18 being situated at a distance from one another longitudinally with respect to the longitudinal direction of the support apparatus, as shown.

The longitudinal beams of the center support part 6 are connected to an outer frame 20 of the slatted frame 2, which during use of the slatted frame 2 is insertable into a bed frame, for example.

For the electric motor adjustment of the support parts 4 through 14 relative to one another, a universal electric motor furniture drive 21 according to a first embodiment of the invention is provided, which has a base body, designed i.e.

configured as a housing 22, in which integral parts of the furniture drive are accommodated as described in greater detail below.

FIG. 1 shows the slatted frame 2 in a maximum adjusted position which corresponds to a sitting position.

Figure 2:
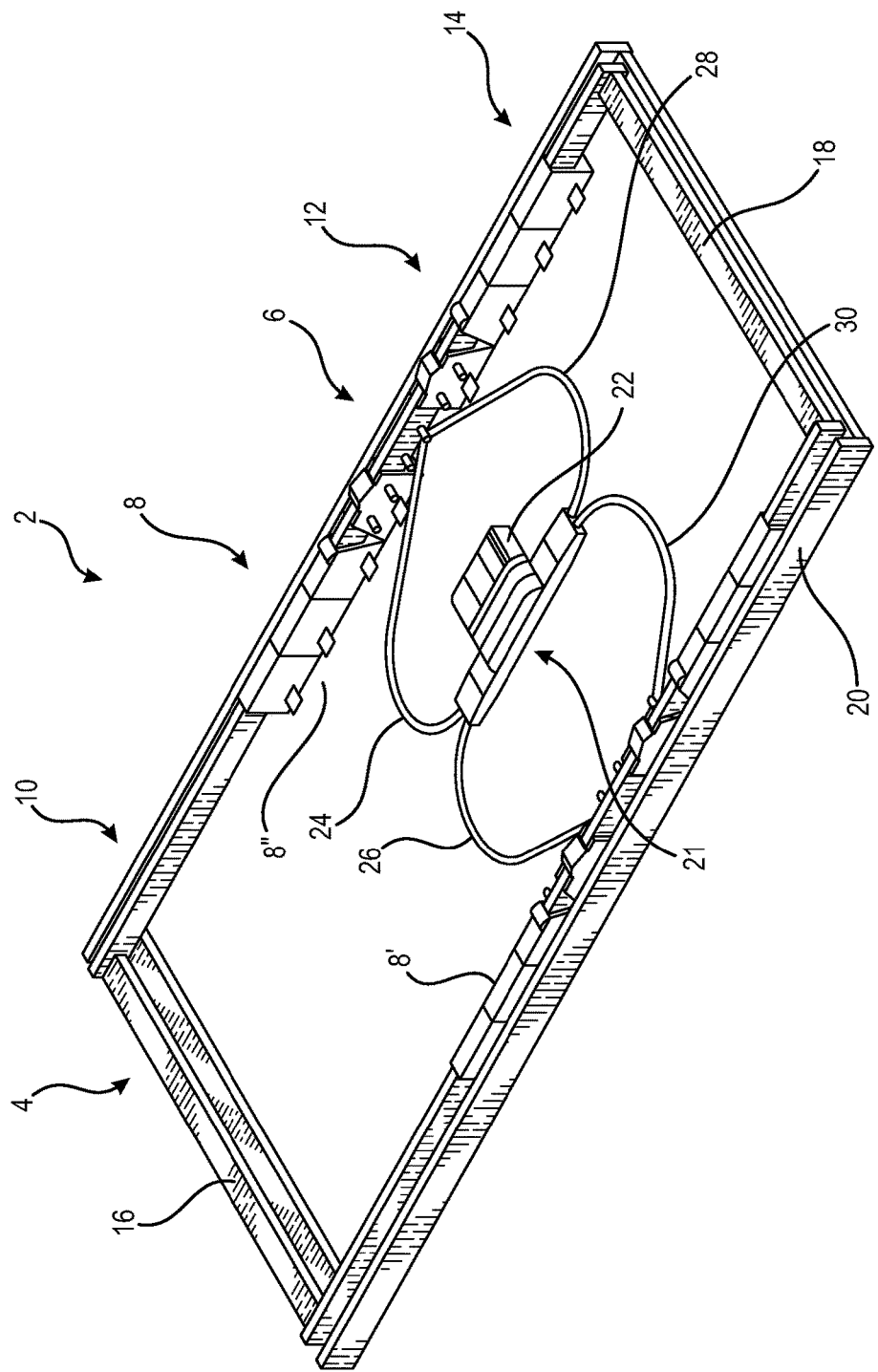
FIG. 2 shows, in the same illustration as FIG. 1, the slatted frame according to FIG. 1 in an unadjusted position.

FIG. 2 shows the slatted frame 2 in an unadjusted position which corresponds to a lying position, and in which the support parts 6 through 14 together span a continuous, essentially horizontal, support plane.

The invention is explained below with reference to an adjustment of the pivotably adjustable upper body support part (second support part) relative to the center support part 6 (first support part). The adjustment of the leg support part 8 relative to the center support part 6 is carried out in a corresponding manner, and therefore is not discussed here in greater detail.

During a pivot adjustment of the upper body support part 12 relative to the center support part 6, the head support part 14 is adjusted relative to the upper body support part 12 at the same time, the head support part 14 being connected to the upper body support part 12 via a corresponding pivot joint. The same applies for an adjustment of the calf support part 10 during an adjustment of the leg support part 8.

In the illustrated embodiment, an electric motor furniture drive 21 according to the invention, which in the present embodiment is designed as a dual drive, is provided for the adjustment, and has a drive unit 23 (see FIG. 3) which in the illustrated embodiment has two drive trains. One drive train is associated with the upper body support part 12 for adjusting same relative to the center support part 6, while the other drive train is associated i.e. operatively associated with the leg support part 8 for adjusting same relative to the center support part 6. In the illustrated embodiment, the drive unit 23 has two electric motors as drive motors (explained in greater detail below), each being associated with a drive train.

According to the invention, at least one Bowden cable having a traction cable which is accommodated in sheathing is provided for transmitting force from the furniture drive 21 to the second support part (upper body support part 12).

In the embodiment illustrated in the drawing, two Bowden cables 24, 26 are associated with the second support part (upper body support part 12), the Bowden cable 24 being in operative connection with one longitudinal beam 12", and the other Bowden cable 26 being in operative connection with the other longitudinal beam 12', of the upper body support part 12. Only the cooperation of the Bowden cable 24 with the longitudinal beam 12" is described below. The cooperation of the Bowden cable 26 with the other longitudinal beam 12' is correspondingly similar, and therefore is not explained in greater detail below. The same applies for the cooperation of further Bowden cables 28, 30 with the longitudinal beams 8" and 8', respectively, of the leg support part 8.

Figure 3:
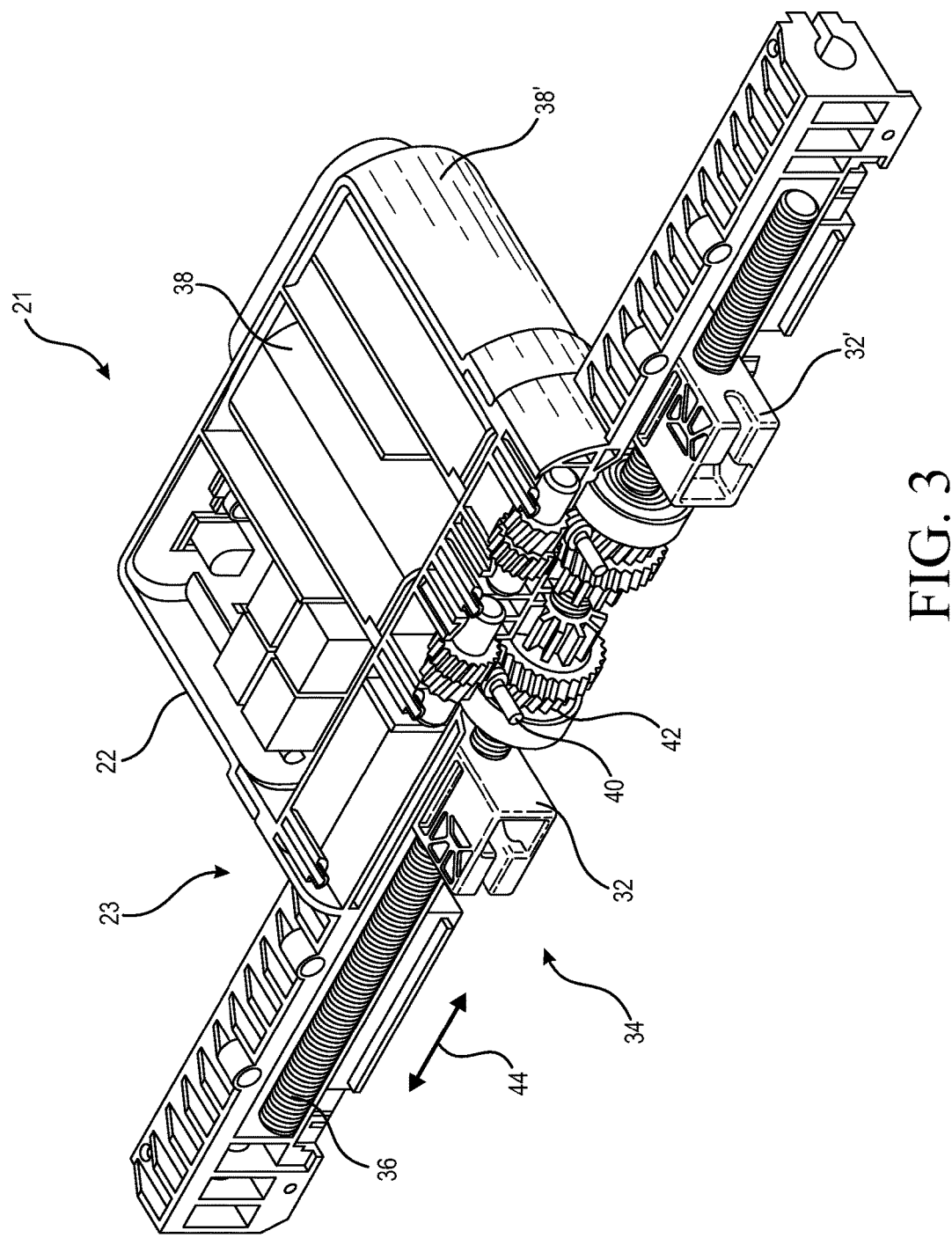
FIG. 3 shows a sectional view of a housing of the furniture drive according to FIG. 1, in enlarged scale compared to FIG. 1.

FIG. 3 shows a perspective view of the housing 22, which for purposes of illustration is shown partially open. The Bowden cable 24, which is not illustrated in FIG. 3, has a traction cable, accommodated in flexible sheathing in a generally known manner, which may be subjected to tension, and which is subjected to tension when the upper body support part 12 is adjusted relative to the center support part 6. For pulling on the traction cable, a linearly movable tensioning element is associated with the Bowden cable 24, and in the illustrated embodiment is formed by a spindle nut 32 of a spindle drive 34 whose threaded spindle 36 is in rotary drive connection with an electric motor 38. For this purpose, a drive shaft 40 of the electric motor 38 is designed as a screw which is engaged with a worm wheel 42 that is connected to the threaded spindle 36 in a rotationally fixed manner. Accordingly, the spindle nut 32 is movable in the axial direction of the threaded spindle along a double arrow 44, corresponding to the rotational direction of the drive shaft 40 of the electric motor 38. FIG. 3 shows the spindle nut 32 in a position which corresponds to a maximum adjusted position of the upper body support part 12 relative to the center support part 6 (see FIG. 1).

Figure 4:
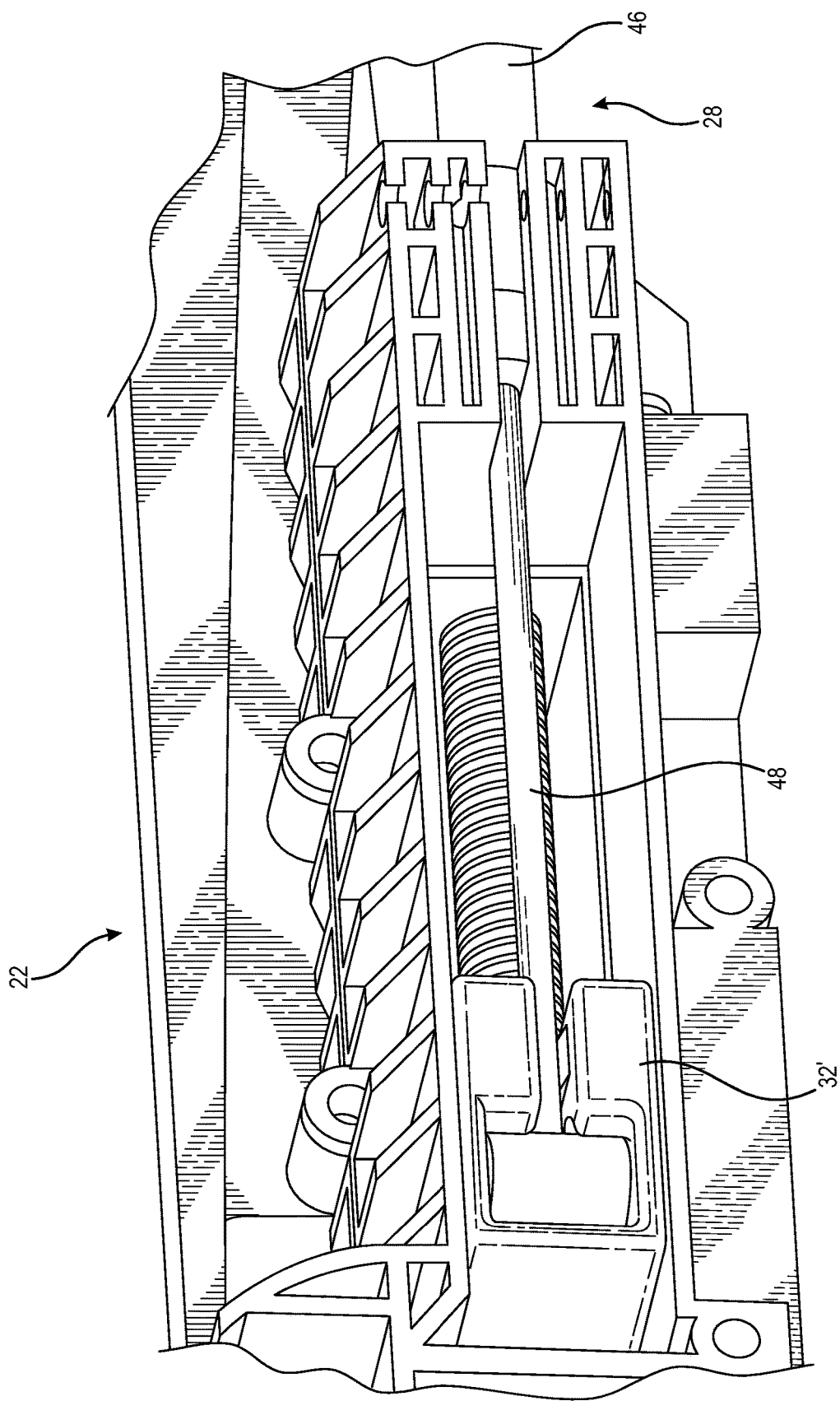
FIG. 4 shows a detail in the area of a housing of the furniture drive according to FIG. 1, in greatly enlarged scale compared to FIG. 1, the housing being illustrated in the open state for purposes of illustration.

The connection of the Bowden cable 24 to the spindle nut 32 is explained in greater detail below with reference to FIG. 4. FIG. 4 shows the connection of the Bowden cable 28 to a further spindle nut 32' which is in drive connection with a further electric motor 38'. The Bowden cable 24 is correspondingly connected to the spindle nut 32.

The Bowden cable 28 has sheathing 46 which is fixed to the housing 22, and has a traction cable 48 which is fixed to the spindle nut 32' and thus connected to same in a tension-resistant manner.

Figure 5:
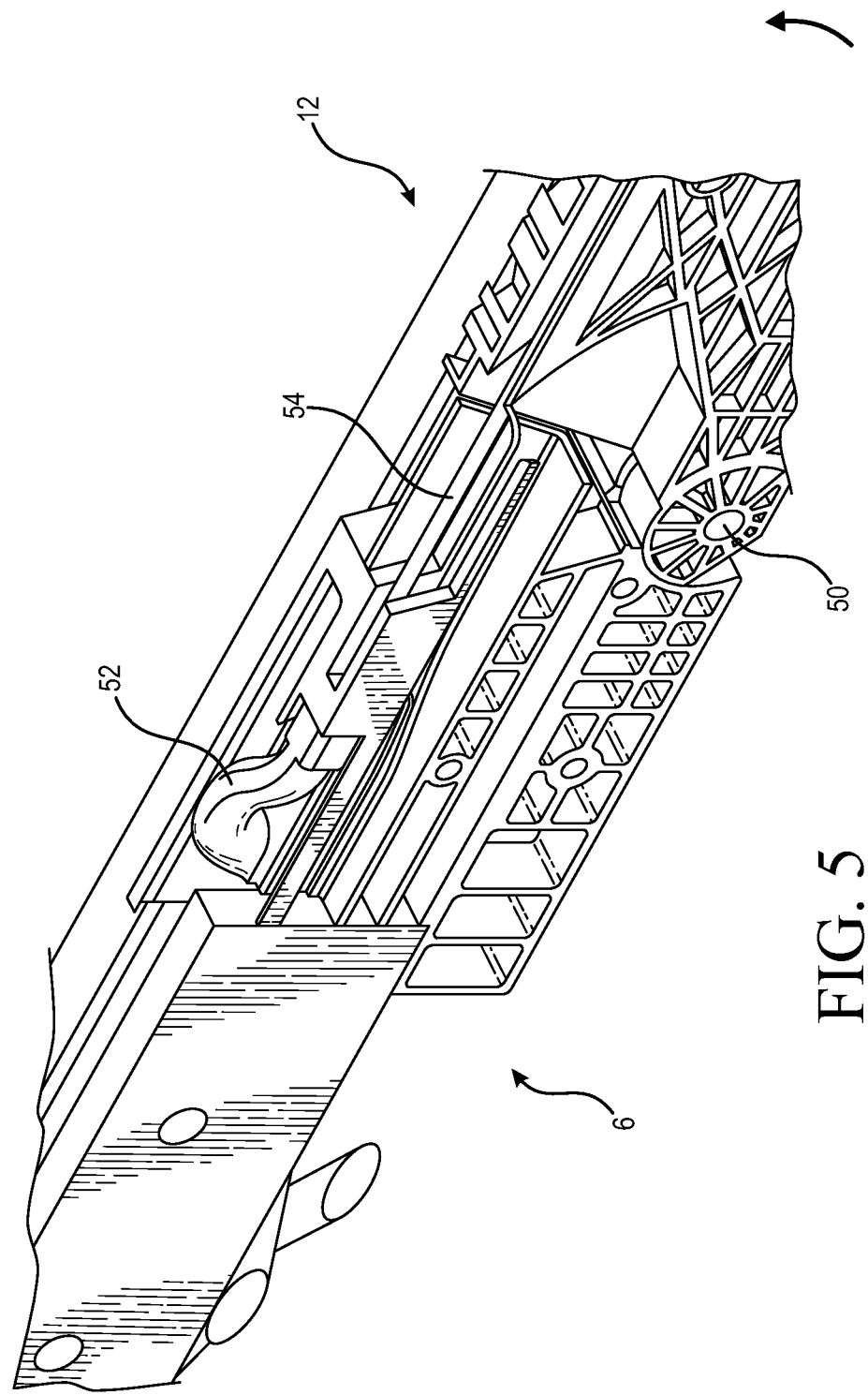
FIG. 5 shows, in an illustration similar to FIG. 4, a detail in the area of a pivot axis between two support parts of the slatted frame according to FIG. 1.

FIG. 5 shows a detail in the area of the connection of the upper body support part 12 to the center support part 6. The upper body support part 12 is connected to the center support part 6 about a horizontal pivot axis 50. As illustrated in FIG. 5, sheathing 52 of the Bowden cable 24 is fixed to the center support part 6, while the traction cable 54 of the Bowden cable 24 is fixed to the upper body support part 12, eccentrically with respect to the pivot axis 50.

In the unadjusted position of the slatted frame (see FIG. 2), the spindle nut 32 is situated at the left end of the threaded spindle 36 in FIG. 3. For adjusting the upper body support part 12 relative to the center support part 6, the electric motor 38 turns the threaded spindle in a rotational direction which corresponds to a movement of the spindle nut 32 to the right in FIG. 3. This causes the spindle nut 32 to pull on the traction cable 54 of the Bowden cable 24, so that the upper body support part 12 is swiveled relative to the center support part 6 until a user of the slatted frame 2 interrupts the adjustment movement, or until the electric motor is switched off by an end position switch (not illustrated) in a maximum adjustment position (FIG. 1). A control apparatus for controlling the drive means of the slatted frame 2, as well as a power supply apparatus have been omitted in FIG. 1 in order to simplify the illustration.

The adjustment force applied by the electric motor 38 is introduced into the longitudinal beam 12' of the upper body support part 12 at the same time via the Bowden cable 26. In order to synchronize the introduction of the adjustment force into the longitudinal beams 12', 12" of the upper body support part 12, both of the traction cables of the Bowden cables 24, 26 are advantageously fixed to the spindle nut 32.

The slatted frame 2 is reset from the adjusted position (see FIG. 1) into the unadjusted position (see FIG. 2) or an intermediate position with the drive switched on, but under the influence of the weight of the particular support part or support parts, optionally also under the weight of a person resting on the slatted frame 2.

As a result, in the illustrated embodiment the invention provides a slatted frame which has considerable freedom with regard to the arrangement of the furniture drive relative to the support parts to be adjusted.

As is apparent from FIG. 1, in the illustrated embodiment the housing 22 has only a low overall height, so that a particularly flat slatted frame drive is achieved.

Due to the use of Bowden cables, according to the invention in particular slatted frames of different widths may be implemented, using essentially matching components.

In a modification of the embodiment according to FIG. 1, at least one longitudinal beam of at least one of the support parts 4 through 14 may also have a hollow design for accommodating parts of the electric motor drive means. In this regard, in particular an electric motor of the drive means may be situated outside the hollow longitudinal beam, while, for example, parts of a gear system are accommodated inside the hollow longitudinal beam, as known per se from EP 1 633 219 B1, the contents of which are hereby fully incorporated by reference into the present patent application. According to the invention, it is also possible for at least one electric motor of the electric motor drive means to be accommodated inside a hollow longitudinal beam, as known per se from DE 199 62 541 C2, the contents of which are likewise fully incorporated into the present patent application.

Figure 6:
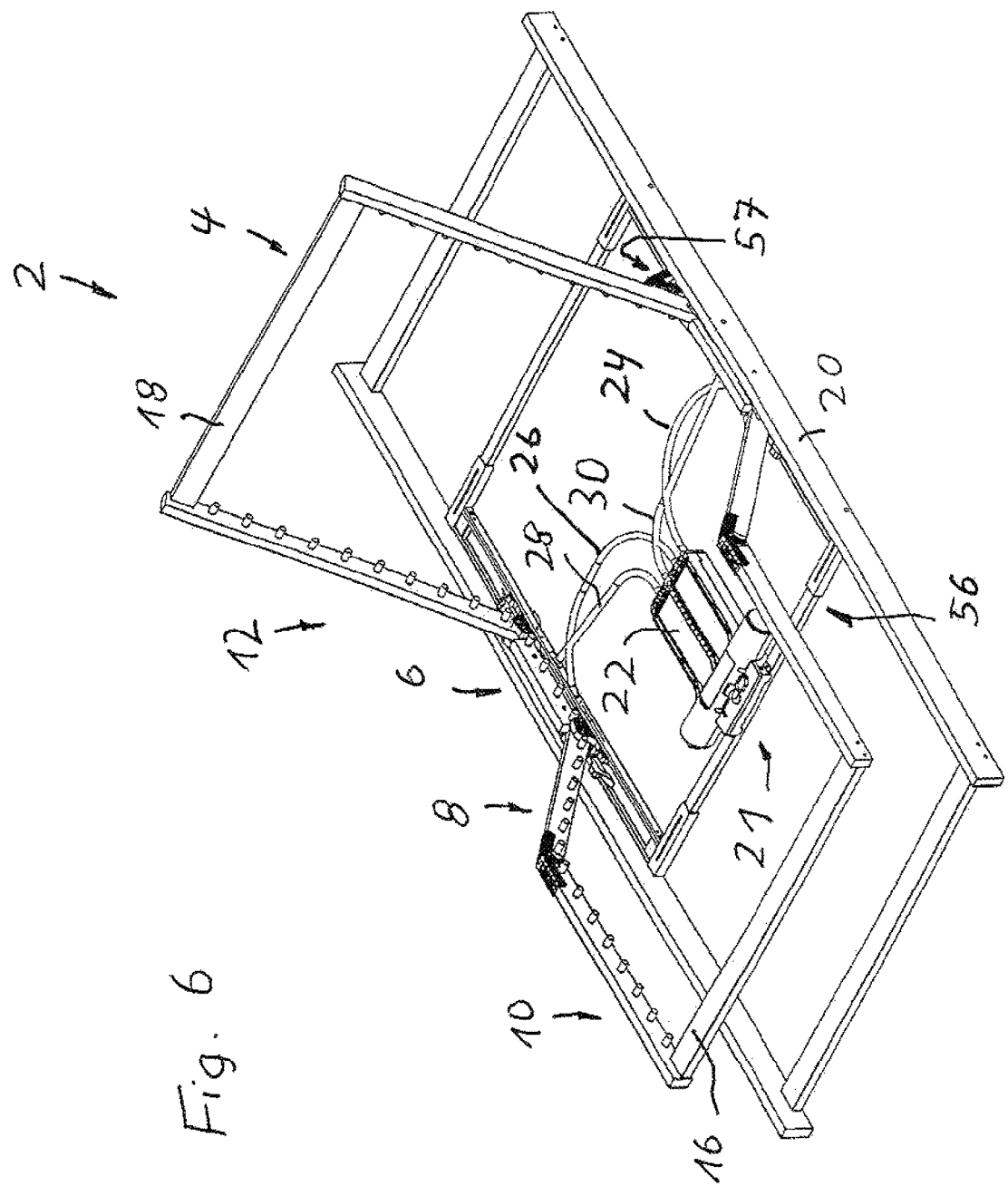
FIG. 6 shows, in the same illustration as FIG. 1, a slatted frame which is provided with a second embodiment of a furniture drive according to the invention, in its maximum adjusted position.

FIG. 6 illustrates a slatted frame 2 which is adjustable by means of a second embodiment of a furniture drive 21 according to the invention. The basic principle of the adjustment is the same as described for the first embodiment with reference to FIGS. 1 through 5.

The second embodiment of the furniture drive 21 according to the invention illustrated in FIG. 6 differs from the embodiment according to FIG. 1 primarily with regard to its design, which is explained in greater detail below with reference to FIGS. 8 through 12. In addition, the second embodiment differs from the first embodiment in that the housing 22 of the furniture drive 21 is fastened to a mounting frame 56, explained in greater detail below. With regard to the slatted frame 2, another difference between the further embodiments according to FIG. 1 and FIG. 6 is that the slatted frame 2 according to FIG. 1 has an upper body part 12 and a separate head support part 14, while the slatted frame, illustrated in FIG. 6, for supporting the upper body and the head of a person resting on the slatted frame 2 has an integrated upper body support part 12 which at the same time fulfills the function of a head support part.

A further difference of the embodiment according to FIG. 6 from the embodiment according to FIG. 1 is that in each case a stand-up lever arrangement is used for adjusting the support parts 12 and 8, 10 relative to the center support part 6, as indicated by reference numeral 57 in FIG. 6 and explained in greater detail below.

FIG. 6 shows the slatted frame 2 in its maximum adjusted position, which corresponds to a sitting position.

Figure 7:
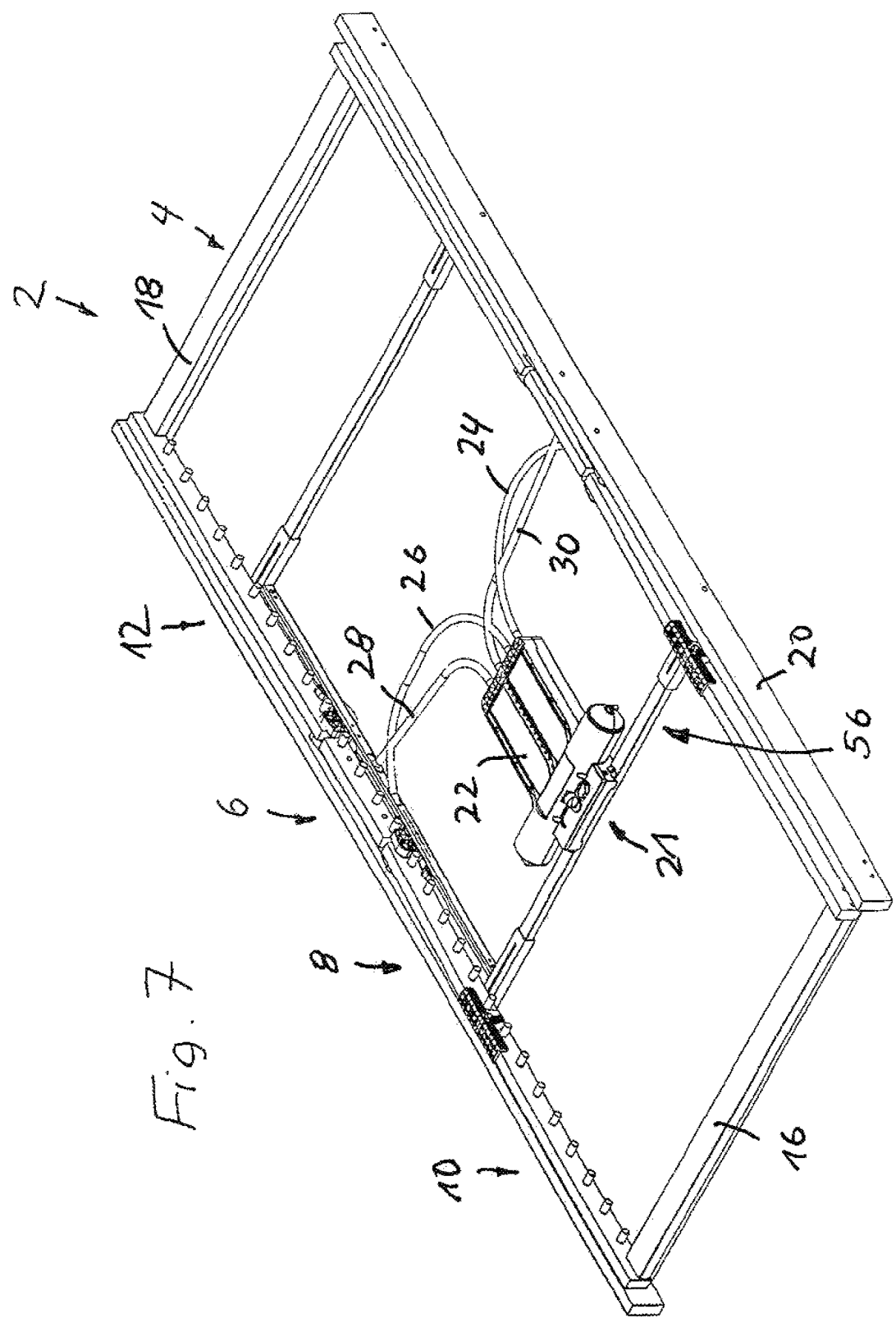
FIG. 7 shows, in the same illustration as FIG. 6, the slatted frame according to FIG. 6 in an unadjusted position.

FIG. 7 shows the slatted frame 2 in its unadjusted position, which corresponds to a lying position.

Figure 8:
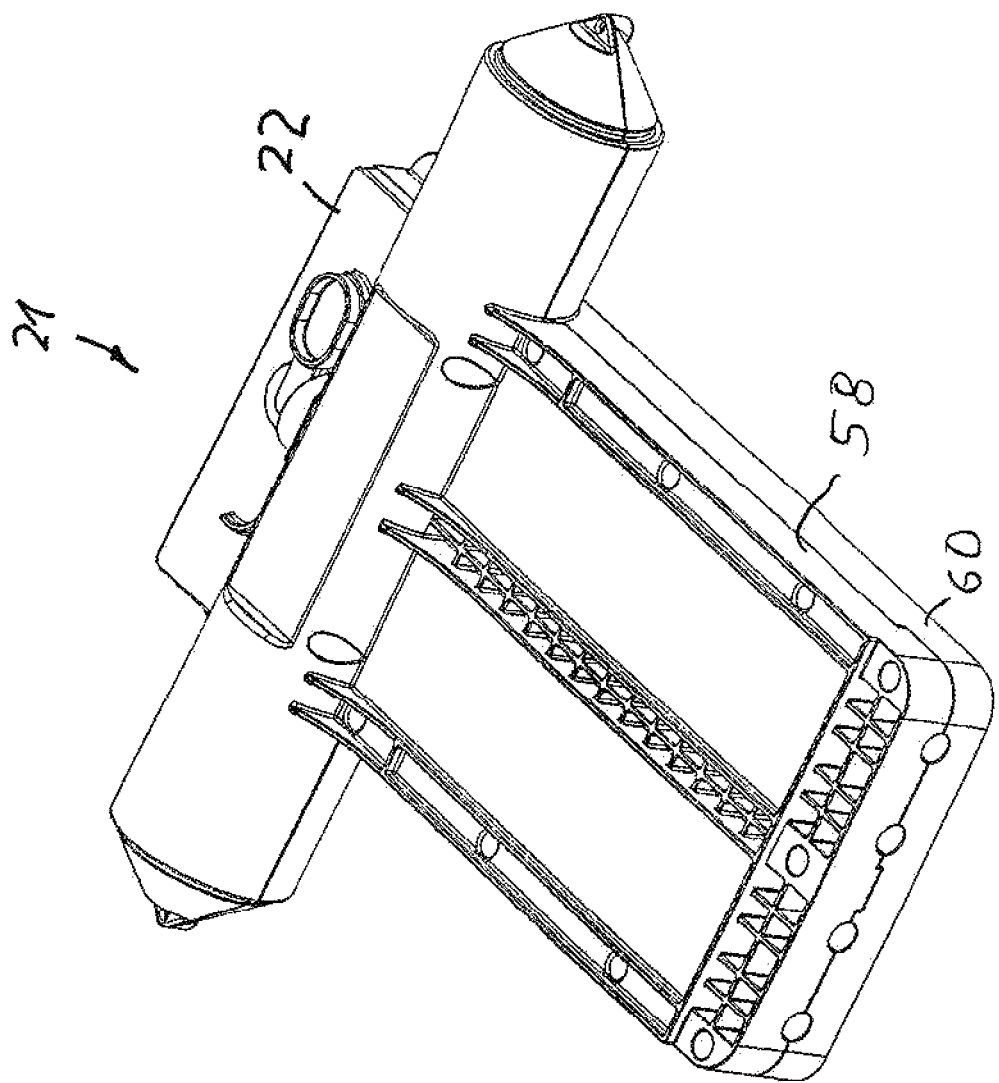
FIG. 8 shows the second embodiment of the furniture drive according to the invention in a perspective view, in enlarged scale compared to FIG. 6.

FIG. 8 shows the furniture drive 21 with the housing 22 illustrated in the closed position. In the illustrated embodiment, the housing is composed of half-shells 58, 60 which may be screwed together for installing the furniture drive 21 in the illustrated embodiment. The half-shells 58, 60 are configured in such a way, as explained in greater detail below, that components of the furniture drive 21 are insertable into one of the half-shells and held in a positive-fit manner by placing the other half-shell on top.

Figure 9:
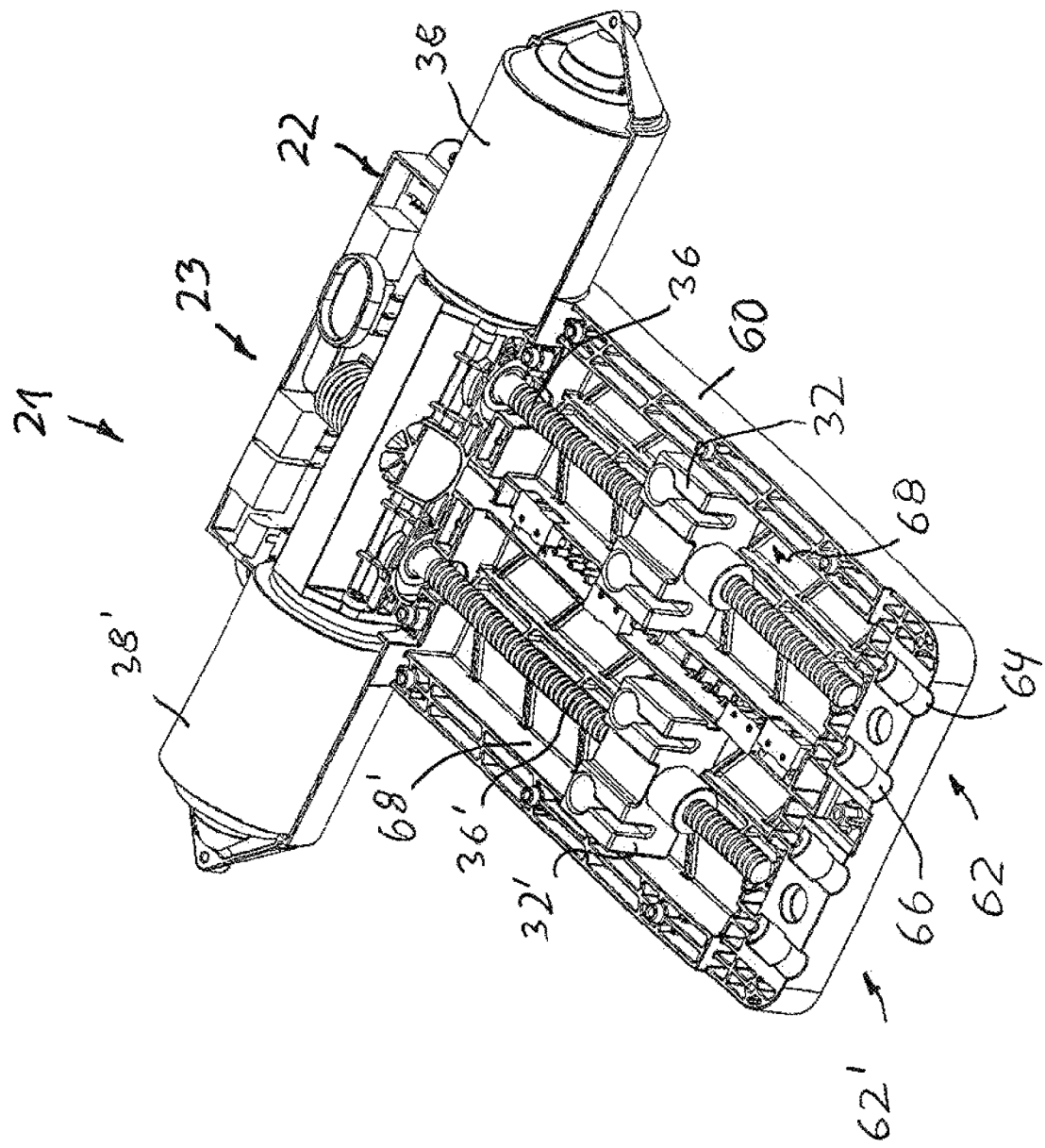
FIG. 9 shows the furniture drive according to FIG. 8, in an illustration with the housing open, corresponding to FIG. 8.
Figure 10:
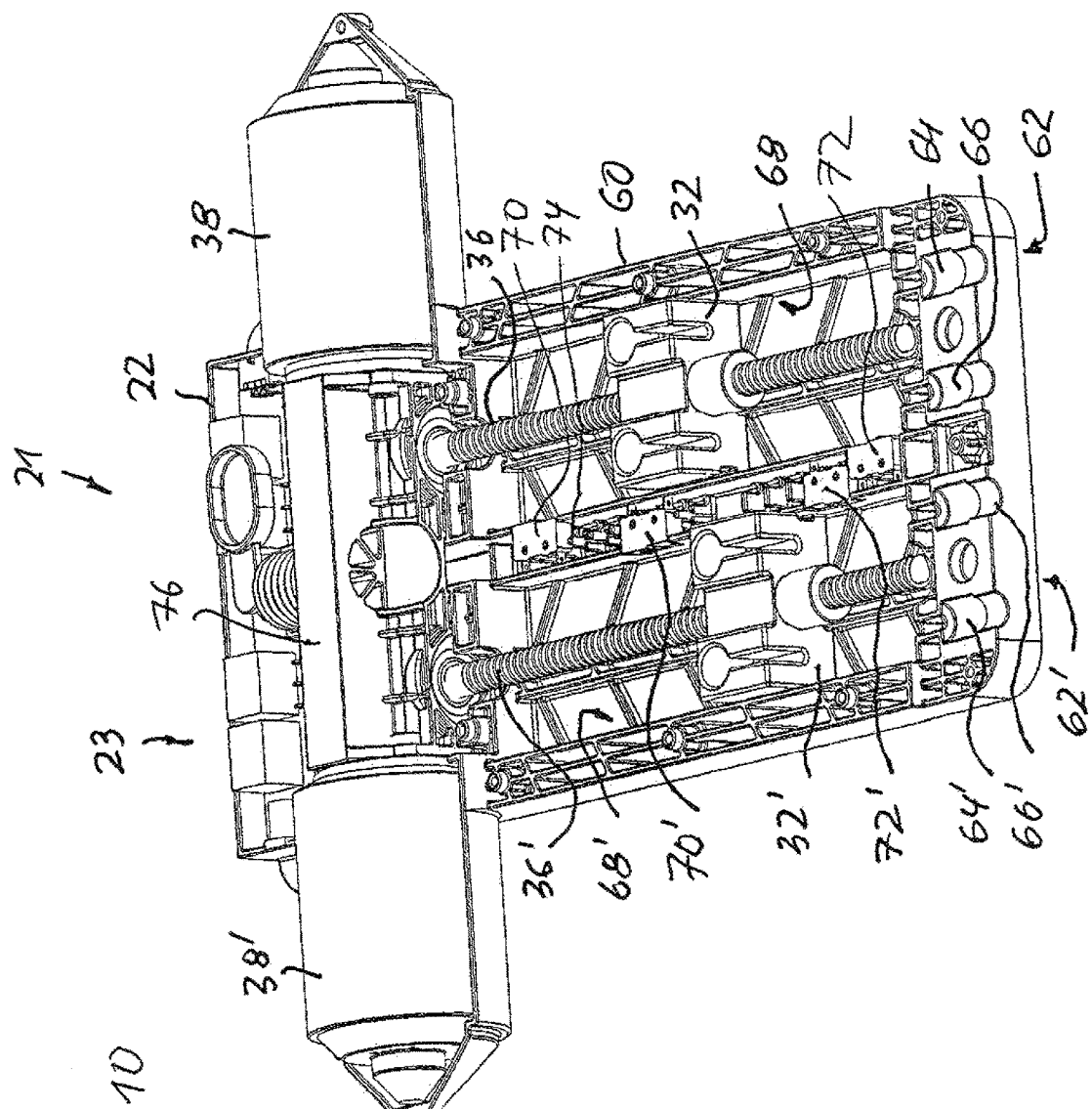
FIG. 10 shows a further perspective view of the second embodiment of the furniture drive according to the invention, in an illustration corresponding to FIG. 9.
Figure 11:
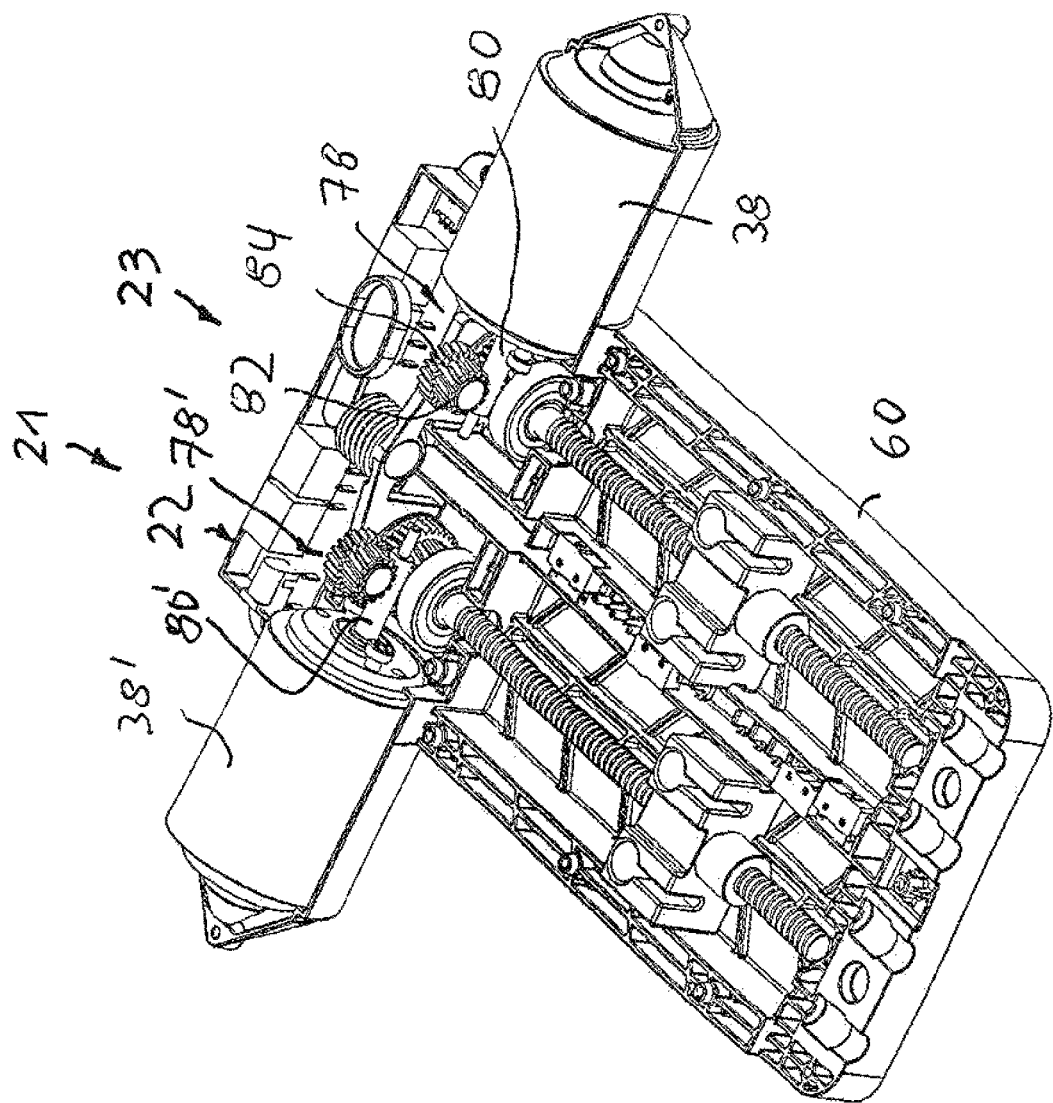
FIG. 11 shows the furniture drive according to FIG. 9 in an illustration corresponding to FIG. 9, with a gear holding part omitted.
Figure 12:
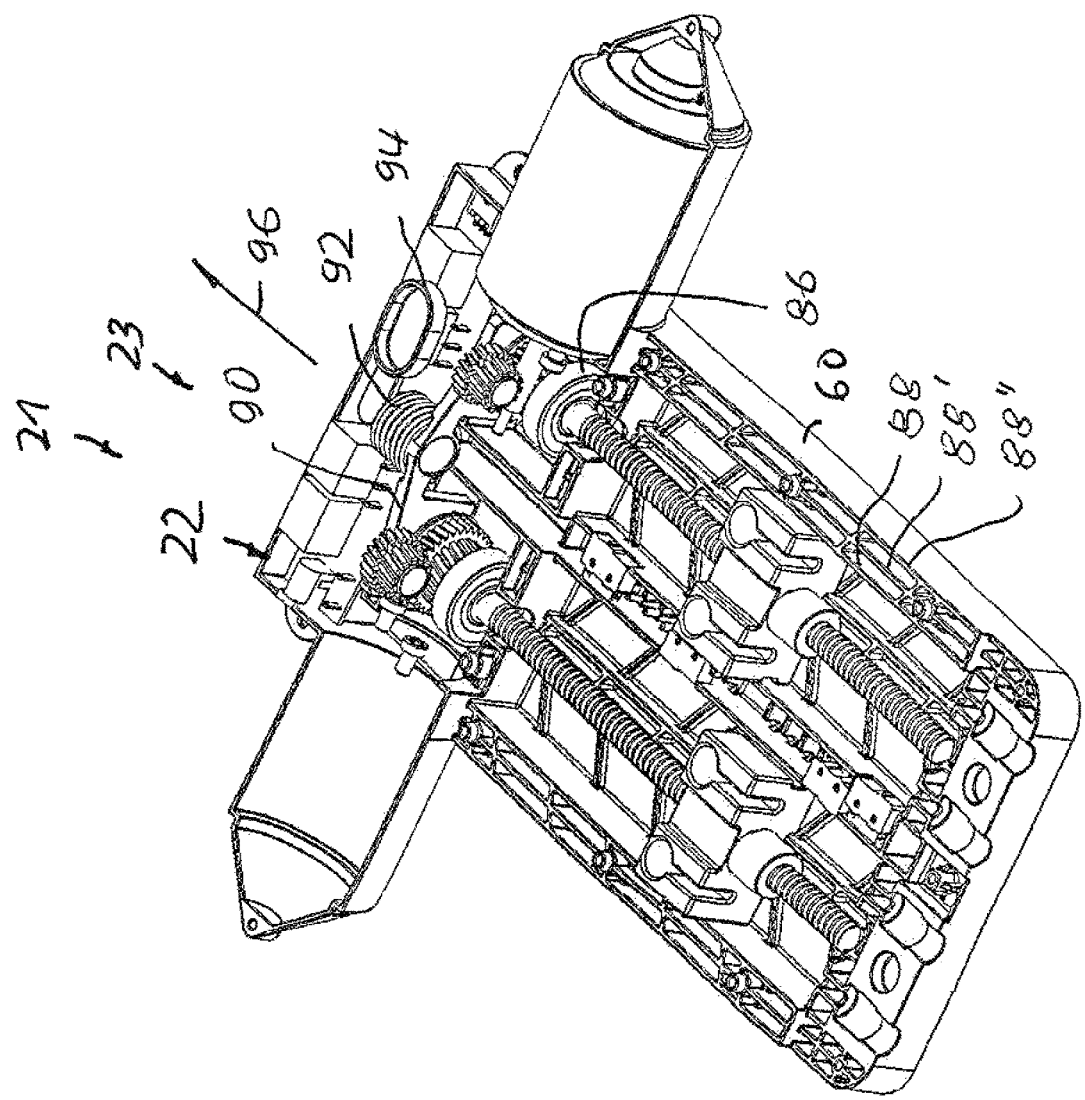
FIG. 12 shows the furniture drive according to FIG. 11 in an illustration corresponding to FIG. 11, also with an electric motor omitted.

FIGS. 9 through 12 show the furniture drive 21 according to the second embodiment with the housing open 22, i.e., in a state in which the top half-shell 58 is removed and components of the furniture drive 21 are inserted into the bottom half-shell 60. FIGS. 9 and 10 show the furniture drive 21 from different perspectives. In FIGS. 11 and 12, components of the furniture drive 21, described in greater detail below, have been omitted for purposes of explanation.

It is apparent from FIG. 9 that in this embodiment the drive unit 23 of the furniture drive 21 has two drive trains 62, 62' which are associated with an electric motor 38, 38', respectively, the electric motors 38, 38' being independently controllable. Only the drive train 62, which is used for adjusting the upper body support part 12 relative to the center support part 6 by means of the Bowden cables 28, 30, is explained in greater detail below. The drive train 62', which is used for adjusting the leg support part 8 relative to the center support part 6 by means of the Bowden cables 24, 26, has a corresponding design and therefore is not explained in greater detail. If necessary for purposes of explanation, the drive train 62' is provided with the reference numerals which correspond to those of the drive train 62. The Bowden cables 28, 30 and the Bowden cables 24, 26 have been omitted in FIGS. 9 through 12 for purposes of illustration.

In the second embodiment, once again two tensioning elements in the form of spindle nuts 32, 32' are provided, at least two Bowden cables being associated with each tensioning element, namely, the Bowden cables 28, 30 being associated with the spindle nut 32, and the Bowden cables 24, 26 being associated with the spindle nut 32'. As mentioned above, the Bowden cables 24 through 30 have been omitted in FIGS. 9 through 12 for purposes of illustration.

The traction cables of the Bowden cables in each case are fixed or fixable to the spindle nuts 32, 32'.

The housing 22 forms a shared or common or single housing in which the drive unit 23 and the tensioning elements, namely, the spindle nuts 32, 32', are accommodated. The traction cables of the Bowden cables 28, 30 are guided to the spindle nut 32 through recesses 64, 66, the sheathing of the Bowden cables 28, 30 in each case being fixed or fixable to the housing 22.

In the illustrated embodiment, the half-shells 58, 60 of the housing 22 are formed by injection-molded parts made of plastic.

The spindle nut 32 is movable in the axial direction of the threaded spindle 36, corresponding to the rotational direction of the drive shaft of the electric motor 38, and is guided in the housing 22 in a rotationally fixed manner by means of a linear guide 68.

As is apparent from FIG. 9, in the illustrated embodiment the linear guides 68, 68' associated with the spindle nuts 32, 32', respectively, extend in parallel to one another.

To independently actuate the drive trains 62, 62', and thus to be able to independently adjust the upper body support part 12 and the leg support part 8 relative to the center support part 6, the electric motors 38, 38' are independently controllable.

Power supply and control means of the electric motors 38, 38' are not illustrated in the drawing for the sake of simplicity. In particular, the control means may be accommodated inside the housing 22.

FIG. 10 shows the furniture drive 21 from another perspective.

For switching off the electric motor 38 in end positions of the adjustment movement, i.e., the maximum adjusted position of the slatted frame 2 illustrated in FIG. 6 and the unadjusted position of the slatted frame 2 illustrated in FIG. 7, in the illustrated embodiment two end position switches 70, 72 are associated with the spindle nut 32. The housing has a plurality of pins as a holding apparatus for the end position switch 70, 72, only one pin being provided with reference numeral 74 in FIG. 10 for the sake of clarity. The pins 74 are molded in one piece into the housing 22, namely, the bottom half-shell 60 in the illustrated embodiment, and situated at a distance from one another parallel to the spindle axis of the threaded spindle 36 in the area between the linear guides 68, 68'. The pins 74 in pairs form a holding apparatus in each case for the end position switch 70, for example, and engage with recesses formed in the housing of the end position switch 70. For mounting in the housing 22, the end position switch 74 is thus placed on two of the pins corresponding to the desired position of the end position switch and thus, the desired maximum adjustment position. The end position switches 70, 72 may thus be attached at various positions in the direction parallel to the spindle axis of the threaded spindle 36, so that the various end positions of the adjustment movement may thus be selected and fixed during installation of the furniture drive 21.

Each of the drive trains 62, 62' has a gear, as explained in greater detail below with reference to FIG. 11, which is situated between the drive shaft of the associated electric motor 38 or 38' and the associated threaded spindle 36, 36'. The integral parts of the gear are situated on a gear holding part 76, which in the present embodiment is formed by an injection-molded part made of plastic. In the illustrated embodiment, the electric motors 38, 38' are fastened to the gear holding part 76 via a screw connection, thus forming a motor/gear assembly.

FIG. 11 shows the furniture drive 21, with the gear holding part 76 omitted for purposes of explanation.

It is apparent from FIG. 11 that a gear 78 is associated with the electric motor 38. In the illustrated embodiment, the drive shaft 80 of the electric motor 38 is designed as a screw of a worm gear which is engaged with a worm wheel 82 that is connected to a gearwheel 84 in a rotationally fixed manner. From the perspective in FIG. 11, it is not discernible, and therefore not explained in greater detail, that the gear 78 has a further screw which likewise is engaged with the drive shaft 80 and connected in a rotationally fixed manner to a further gearwheel which is engaged with the gearwheel 84. The further worm wheel together with the further gearwheel is connected to the threaded spindle 36 in a rotationally fixed manner, so that during rotation of the drive shaft 80 of the electric motor 38, the threaded spindle 36 rotates corresponding to its rotational direction, and thus moves the spindle nut 32 back and forth in the axial direction of the threaded spindle 36, corresponding to the rotational direction thereof.

FIG. 12 shows a view similar to that in FIG. 11, with the electric motor 38' omitted for purposes of illustration. It is apparent from FIG. 12 in particular that in the area of the bottom half-shell 60 the housing is designed in such a way that the electric motors 38, 38', i.e., the motor/gear assembly formed by the gear holding part 36 with electric motors 38, 38' attached thereto, is/are insertable into the bottom half-shell 60, and held by the housing 22 in a positive-fit manner in the inserted position. The top half-shell has a corresponding design. For fixing the electric motors 38, 38' in a positive-fit manner, in the illustrated embodiment the housing 22, i.e., the half-shells 58, 60, has/have a shape that is complementary to the electric motors 38, 38' in sections, as is apparent from FIG. 12.

It is also apparent from FIG. 12 that a ball bearing 86, which may be held by webs molded into the housing 22, is provided for supporting the threaded spindle 36.

It is apparent from an overview of FIGS. 9 through 12 that holding apparatuses for the integral parts of the furniture drive 21 are molded in one piece into the housing 22 or its half-shells 58, 60. This applies in particular for the linear guides 68, 68' and holding apparatuses for the electric motors 38, 38' or the motor/gear assembly, formed by the gear holding part 76 with electric motors 38, 38' attached thereto, which are molded in one piece into the housing 22. The same applies for the holding apparatuses, formed by the pins 74, for the end position switches 70, 72.

It is apparent from an overview of FIGS. 9 through 12 and in particular from FIG. 11 that in the illustrated embodiment the electric motors 38, 38' are situated in the housing 22 in such a way that their drive shafts 80, 80' face one another, and in the illustrated embodiment are aligned with one another. The gears 78, 78' associated with the electric motors 38, 38', respectively, and thus also the gear holding part 76, are situated between the electric motors 38, 38'. At the same time, the spindle axes of the threaded spindles 36, 36', and thus also the linear guides for the spindle nuts 32, 32', extend perpendicularly with respect to the drive shafts 80, 80' of the electric motors 38, 38', respectively. This results in a particularly compact and space-saving design.

The furniture drive 21 according to the invention is thus installed in a particularly simple manner by inserting the motor/gear assembly and the components of the drive trains 62, 62' into the bottom half-shell 60 of the housing 22. The end position switches 70, 72 may then be mounted in the desired position, and the Bowden cables may be suspended on the spindle nuts 32, 32' and thus fastened. The top half-shell 58 may then be placed on top, and the two half-shells 58, 60 joined together.

Another advantage of this embodiment is that it is particularly easy to service due to its modular construction.

Depending on the particular requirements, the housing 22 may have a double- or multi-wall design in sections, in particular in the area of the linear guides 68, 68', as illustrated in FIG. 12 by three walls 88, 88', 88" of the outer wall of the housing 22.

To be able to manually carry out emergency lowering in the event of a power failure, for example, the electric motors 38, 38' are decoupleable from the threaded spindles 36, 36', respectively. For this purpose, the worm wheels of the gears 78, 78' are supported on a bracket 90 which by means of a finger grip 94 is movable against the action of a coil spring 92 in the direction of an arrow 96, from the engaged position illustrated in FIG. 12 into an emergency lowering position. In the engaged position illustrated in FIG. 12, the coil spring 92 presses the bracket 90 against a stop, the worm wheels of the gears 78, 78' being engaged with the drive shaft 80, 80' of the electric motor 38, 38', respectively, thus establishing a rotary drive connection between the drive shaft 80 and the threaded spindle 36, or the drive shaft 80' and the threaded spindle 36. For emergency lowering, the bracket 90 is moved in the direction of the arrow 96 by means of the finger grip 94, so that the screws of the gears 78, 78' are disengaged from the drive shafts 80, 80' of the electric motors 38, 38', respectively, thus eliminating the rotationally fixed connection to the threaded spindles 36, 36'. In this emergency lowering position, adjusted support parts of the piece of furniture may be adjusted by hand by means of the furniture drive 21.

Figure 13:
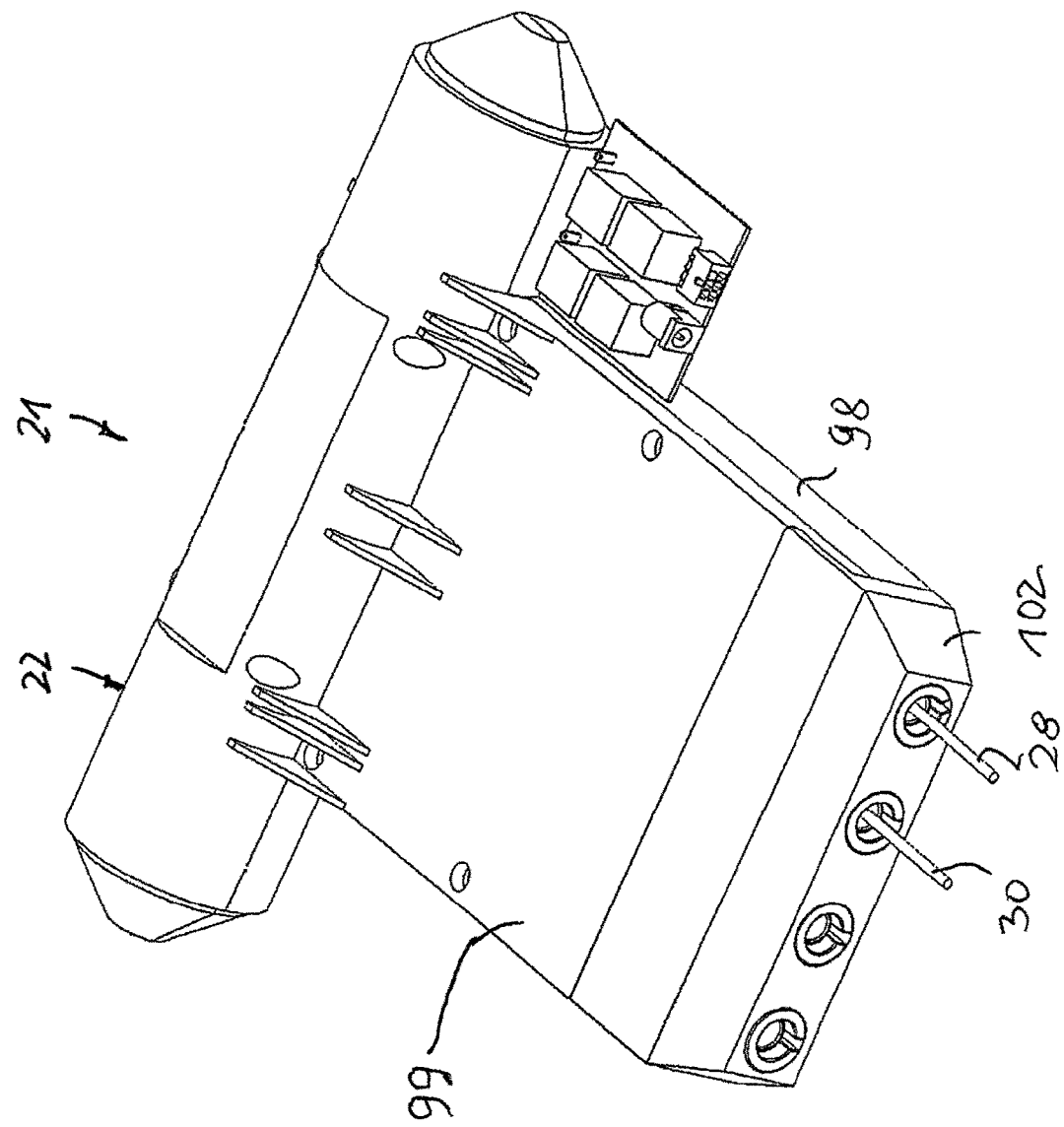
FIG. 13 shows a third embodiment of a furniture drive according to the invention in an illustration corresponding to FIG. 8, in a perspective view with the housing closed.

FIG. 13 illustrates a third embodiment of a furniture drive 21 according to the invention, which differs from the embodiment according to FIGS. 6 through 12 primarily by the design of the housing 22.

In the third embodiment, the housing is composed of a bottom part 98, a top part 99, and an end cap 102.

Figure 14:
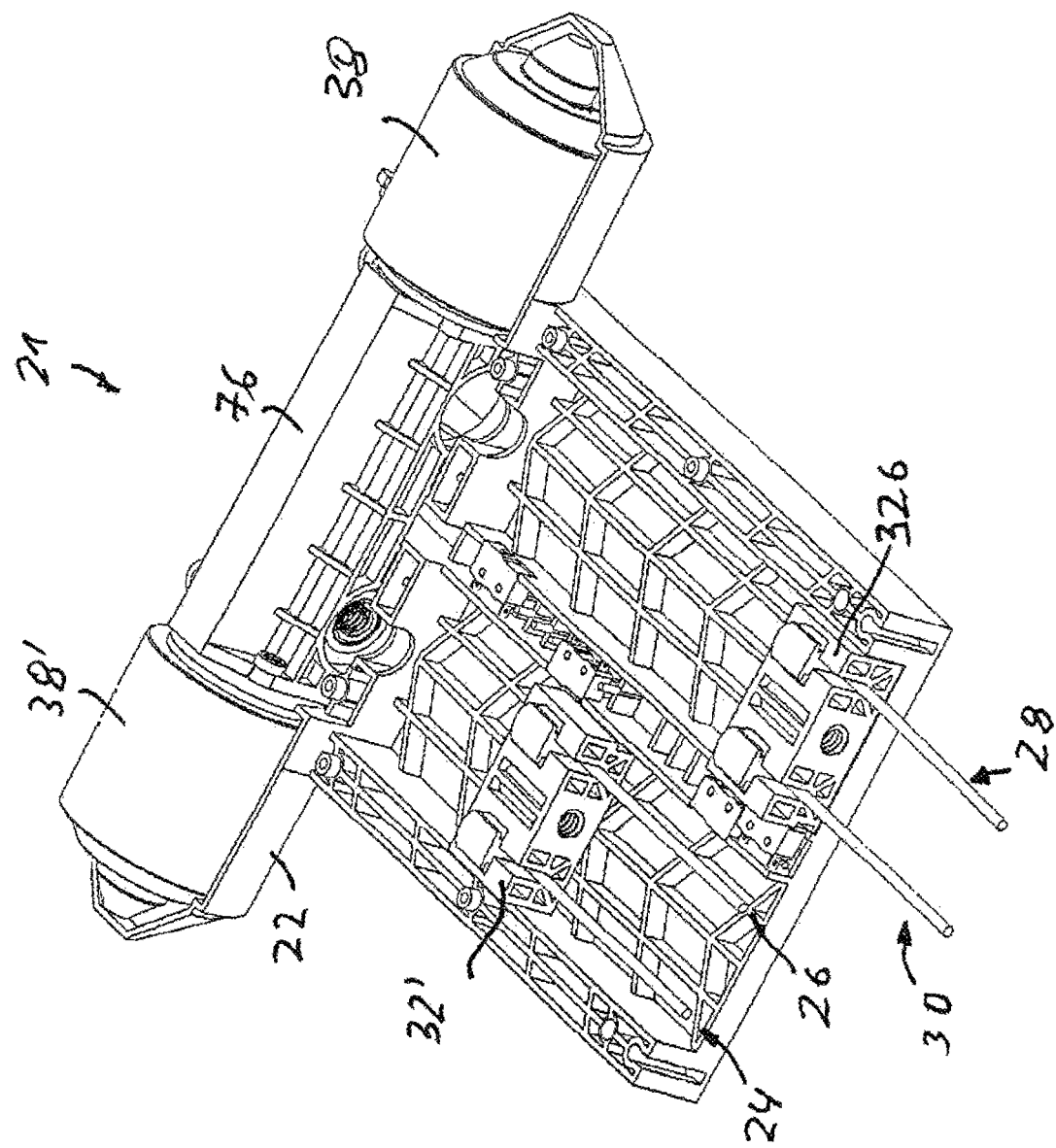
FIG. 14 shows the furniture drive according to FIG. 13 with the housing open.

FIG. 14 shows the housing 22 with the top part 99 and the end cap 102 removed, with various components of the drive trains 62, 62' omitted for purposes of illustration. For installing the furniture drive 21, in the present embodiment the spindle nuts 32, 32' are moved into a predefined mounting position, as illustrated in FIG. 14 for the spindle nut 32. The end cap 102 together with premounted Bowden cables, as illustrated in FIG. 13 for the Bowden cables 28, 30, is subsequently placed on the bottom part, the Bowden cables 28, 30 engaging with the spindle nut 32. Installation of the furniture drive 21 is further simplified in this way.

Figure 15:
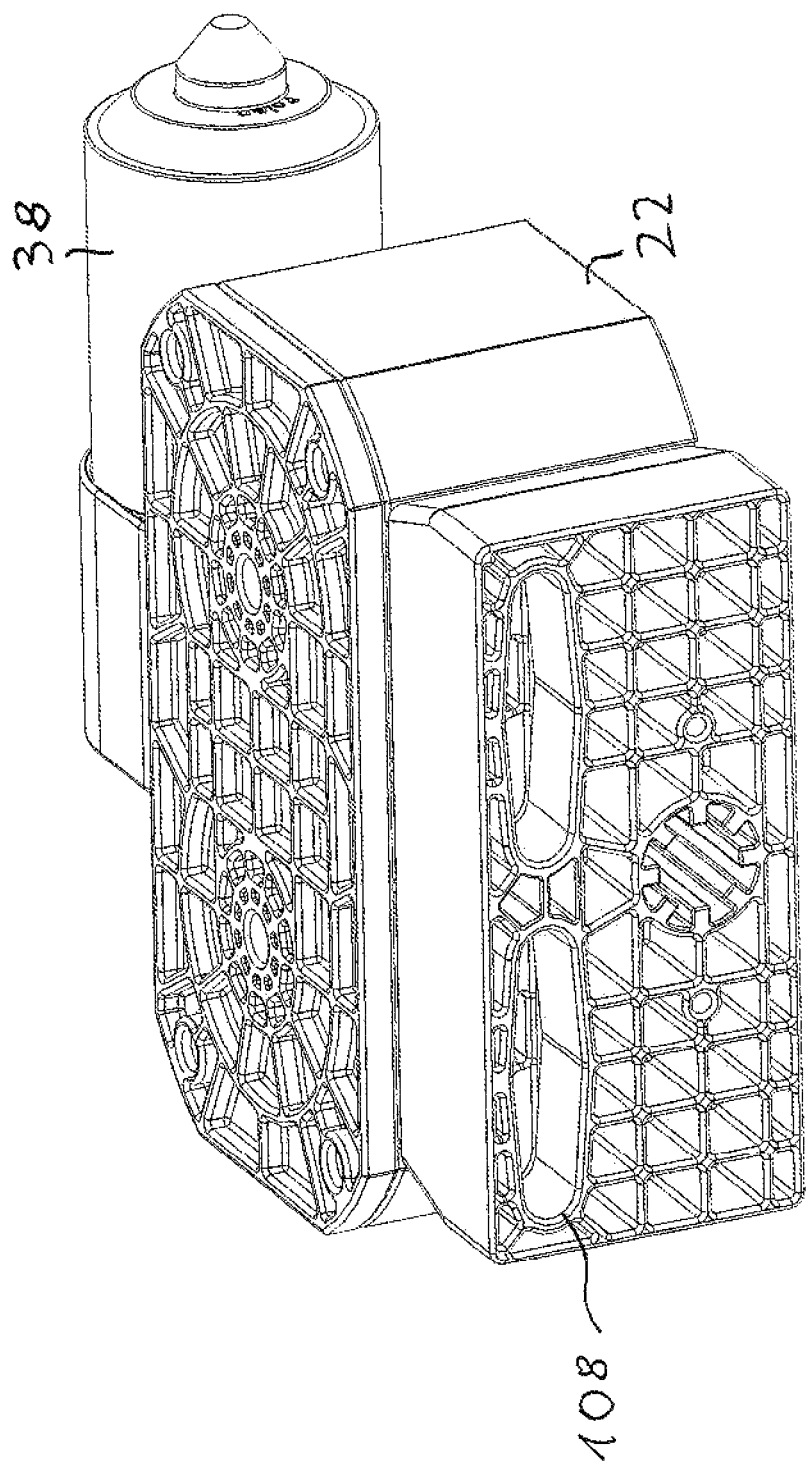
FIG. 15 shows a fourth embodiment of a furniture drive according to the invention, in a perspective view with the housing closed.

FIG. 15 illustrates a fourth embodiment of a furniture drive according to the invention, having a base body designed as a housing 22, and in which the drive unit has a single electric motor 38. The Bowden cables have been omitted in FIG. 15 in order to simplify the illustration.

Figure 16:
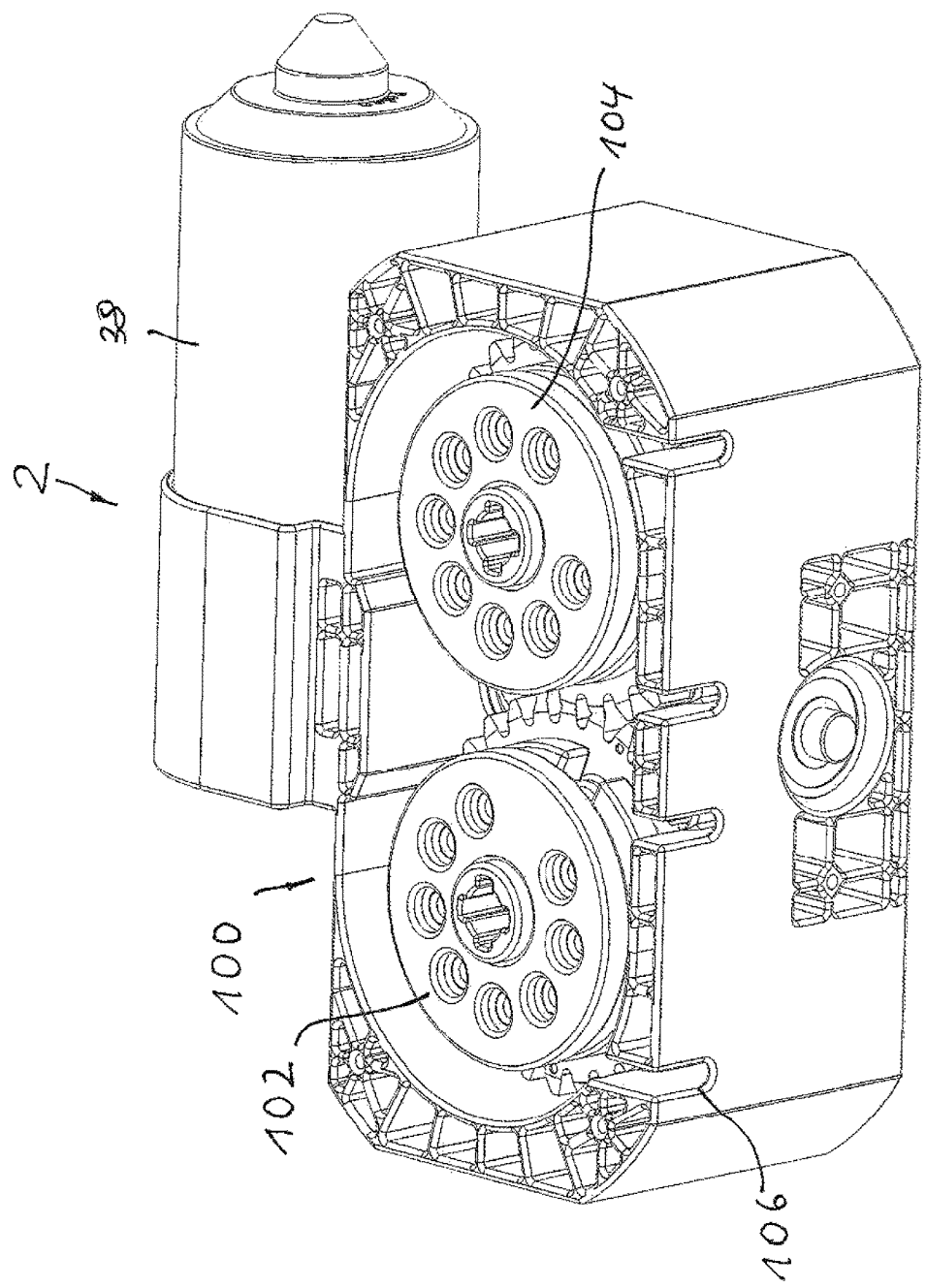
FIG. 16 shows the embodiment according to FIG. 15, with covers on the housing omitted for purposes of illustration.

FIG. 16 shows the embodiment according to FIG. 15, in which parts of the housing 22 have been omitted for purposes of illustration.

The fourth embodiment differs from the embodiments explained above primarily in that at least one tensioning element is designed as a wind-up device for winding the traction cable of a Bowden cable. FIG. 16 illustrates a tensioning unit 100, which as a tensioning element has two wind-up devices 102, 104 which are designed as winding drums. If the furniture drive is used, for example, for actuating the Bowden cables 24, 26 (see FIG. 1), for example the traction cable of the Bowden cable 24 is fixed to the winding drum 102, and the traction cable of the Bowden cable 26 is fixed to the winding drum 104. The sheathings of the Bowden cables 24, 26 are fixed to the housing 22 (see FIG. 15).

Only the winding drum 102 is described below. The winding drum 104 has a corresponding design, and therefore is not explained here in greater detail.

The winding drum 102 is supported in the housing 22 so as to be rotatable about a rotary axis, and has a winding core onto which the traction cable of the associated Bowden cable is wound during turning of the winding drum 102. The traction cable of the Bowden cable is guided through recesses 106 and 108 (see FIG. 15), from the housing 22 to a component to be adjusted. In order to actuate the Bowden cables 24, 26 (see FIG. 1), for example, in a precisely synchronous manner, the winding drums 102 are rotationally synchronized in the illustrated embodiment.

Figure 17:
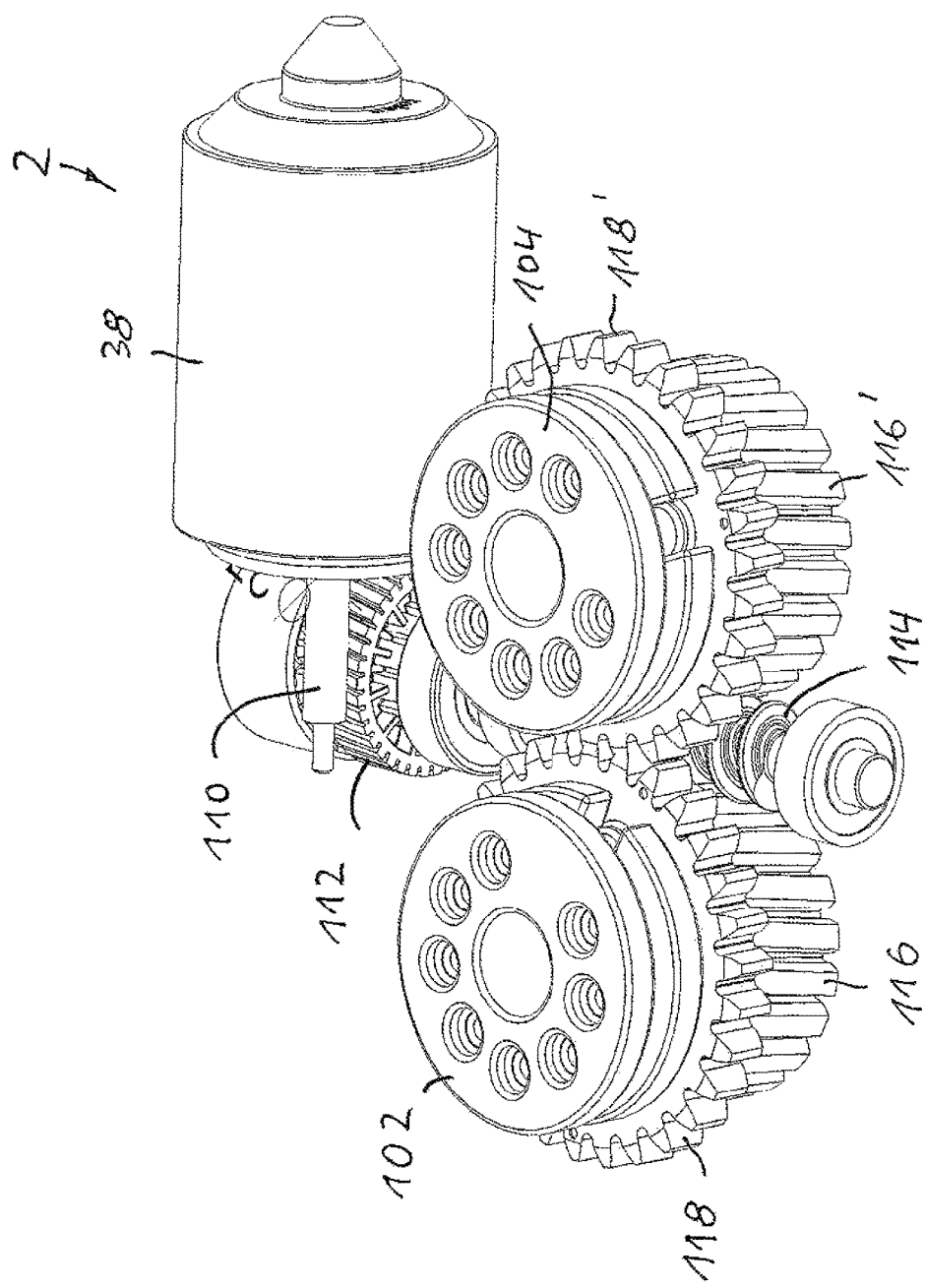
FIG. 17 shows the embodiment according to FIG. 15 in a perspective view, with the housing omitted for purposes of illustration.

FIG. 17 shows the underlying drive mechanism. The drive shaft of the electric motor 38 is designed as a first screw 110 which is engaged with a first worm wheel 112. A second screw 114 is connected to the first worm wheel 112 in a rotationally fixed manner, and is engaged with a second worm wheel 116 which is connected to the winding drum 102 in a rotationally fixed manner. In addition, a spur gear 118 is connected to the winding drum 102 and the second worm wheel 116 in a rotationally fixed manner. The drive connection between the electric motor 38 and the winding drum 104 has a corresponding design, a further second worm wheel 116 being connected to the winding drum 104 in a rotationally fixed manner. Furthermore, a spur gear 118' is connected to the winding drum 104 in a rotationally fixed manner, and is engaged with the spur gear 118, thus rotationally synchronizing the winding drums 102, 104.

During use of the furniture drive 2, the electric motor 38 via its drive shaft drives the screw 114, which rotationally drives the winding drums 102, 104 via the second worm wheels 116, 116', respectively, so that the traction cables of the associated Bowden cables, for example the Bowden cables 24, 26 (see FIG. 1), are wound or unwound, corresponding to the rotational direction of the drive shaft 110.

It is apparent from an overview of FIGS. 15 through 17 that the embodiment according to these figures has a simple and particularly compact design.

FIG. 18 shows a fifth embodiment of a furniture drive 2 according to the invention.

FIGS. 19A through 19C show the embodiment according to FIG. 18, with the housing 22 omitted for purposes of illustration. The embodiment according to FIG. 18 and FIG. 19 differs from the embodiment according to FIG. 15 primarily in the manner in which a rotary movement of the drive shaft of the electric motor 38 is converted into a rotary movement of the winding drums 102, 104.

It is apparent from FIG. 19A that the winding drums 102, 104 in the illustrated embodiment are connected to one another in a rotationally fixed manner. The drive shaft 110 of the electric motor 38 is designed as a screw that is engaged with a worm wheel 112, to which a first spur gear 120 is connected in a rotationally fixed manner.

The first spur gear 120 is engaged with a second spur gear 122 (see FIG. 19B in particular) which is connected in a rotationally fixed manner to a third spur gear 124, which in turn is engaged with a fourth spur gear 126 which is connected to the winding drums 102, 104 in a rotationally fixed manner. During rotation of the drive shaft 110 of the electric motor 38, the winding drums 102, 104 are thus rotationally driven, so that they actuate the traction cables of their associated Bowden cables, for example the Bowden cables 24, 26, corresponding to the rotational direction of the drive shaft 110.

The embodiments illustrated in FIGS. 15 through 19 are suitable, for example, for adjusting the upper body support part 12 of the support apparatus according to FIG. 1. According to the invention, it is also possible to design the winding drums 102, 104 in such a way that at the same time they each wind up a further traction cable, for example the traction cable of one of the Bowden cables 28, 30 (see FIG. 1), in order to adjust the leg support part 8 simultaneously with the upper body support part 12.

If an independent adjustment of the upper body support part 12 and of the leg support part 8 is desired, an additional furniture drive may be provided which is used for adjusting the leg support part 8.

The invention has been explained with reference to embodiments regarding the adjustment of a slatted frame. However, the furniture drive according to the invention is also suitable and usable for adjusting any other given components for which the adjustment may be made by exerting a tensile force. For example, the furniture drive according to the invention is also suitable in industrial applications, or for adjusting doors or windows.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Electric motor-adjustable support apparatus for supporting padding of seating and/or lying furniture, comprising: a) at least two support parts which are adjustable relative to one another; b) each of the at least two support parts to be adjusted having a first longitudinal beam and a second longitudinal beam, the longitudinal beams being situated at a distance from one another transversely with respect to a longitudinal direction of the support apparatus; c) the first longitudinal beam and the second longitudinal beam of a first of the at least two support parts being connected to one another by a first crossbeam and the first longitudinal beam and the second longitudinal beam of a second of the at least two support parts being connected to one another by a second crossbeam, the first and second crossbeams being situated at a distance from one another transversely with respect to the longitudinal direction of the support apparatus; and d) the support apparatus having at least one electric motor furniture drive, the at least one electric motor furniture drive including: i) a common housing; ii) a drive unit provided in the common housing, the drive unit having two electric motors, and the drive unit is in drive connection with two tensioning units; iii) two first Bowden cables being operatively associated with a first tensioning unit of the two tensioning units and two second Bowden cables being operatively associated with a second tensioning unit of the two tensioning units, and a respective traction cable movable in a respective sheathing of the two first and second Bowden cables being in operative connection with an associated tensioning unit of the two tensioning units; iv) the two tensioning units being accommodated in the common housing; v) the respective traction cables being guided to the at least two tensioning units through at least one recess in the common housing; and vi) the respective sheathing of a respective one of the two first and second Bowden cables being fixed to the common housing; e) a first of the two first Bowden cables operatively associated with the first tensioning unit is in force-transmitting connection with the first longitudinal beam of the first support, a second of the two first Bowden cables operatively associated with the first tensioning unit is in force-transmitting connection with the second longitudinal beam of the first support for adjusting the first support part relative to the second support part; f) a first of the two second Bowden cables operatively associated with the second tensioning unit is in force-transmitting connection with the first longitudinal beam of the second support part, a second of the two second Bowden cables operatively associated with the second tensioning unit is in force-transmitting connection with the second longitudinal beam of the second support part for adjusting the second support part relative to the first support part; and g) the common housing being situated between the first longitudinal beam of one of the first or second support parts, the second longitudinal beam, the first crossbeam, and the second crossbeam.

2. The support apparatus according to claim 1, wherein: a) each one of the two tensioning units has a tensioning element, each of which is associated with one of the two first and second Bowden cables.

3. The support apparatus according to claim 2, wherein: a) the two tensioning elements are linearly movable in or on the common housing.

4. The support apparatus according to claim 2, wherein: a) at least one guide for the two tensioning elements is molded in one piece into the common housing.

5. The support apparatus according to claim 4, wherein: a) the at least one guide is a linear guide.

6. The support apparatus according to claim 1, wherein: a) the two electric motors are independently controllable.

7. The support apparatus according to claim 1, wherein: a) the two electric motors are associated with the first and second tensioning units of the two tensioning units respectively and are in drive connection with the same.

8. The support apparatus according to claim 1, wherein: a) the common housing is shaped in such a way that the two electric motors are insertable into the common housing, and in an inserted position the two electric motors are held by the common housing in a positive-fit manner.

9. The support apparatus according to claim 1, wherein: a) the drive unit has at least one gear whose integral parts are situated on a gear holding part; b) the two electric motors are secured to the gear holding part, and together with the gear holding part forms a motor/gear assembly; and c) the common housing is preferably shaped in such a way the motor/gear assembly is insertable into the common housing, and in an inserted position is held by the common housing in a positive-fit manner.

10. The support apparatus according to claim 2, wherein: a) at least one end position switch is operatively associated with the two tensioning elements.

\* \* \* \* \*